(12) United States Patent
Yates et al.

(10) Patent No.: US 11,816,610 B2
(45) Date of Patent: Nov. 14, 2023

(54) SYSTEMS AND METHODS FOR NETWORK RESOURCE ALLOCATIONS

(71) Applicant: Cox Communications, Inc., Atlanta, GA (US)

(72) Inventors: Shane Yates, Atlanta, GA (US); Joseph Keller, Atanta, GA (US); Christian Welin, Atlanta, GA (US); Alexis Hwang, Atlanta, GA (US); Jon Rambo, Atlanta, GA (US); Brian Stublen, Atlanta, GA (US)

(73) Assignee: Cox Communications, Inc., Atlanta, GA (US)

(*) Notice: Subject to any disclaimer, the term of this patent is extended or adjusted under 35 U.S.C. 154(b) by 3 days.

(21) Appl. No.: 17/083,071

(22) Filed: Oct. 28, 2020

(65) Prior Publication Data
US 2022/0129828 A1    Apr. 28, 2022

(51) Int. Cl.
*G06Q 10/00* (2023.01)
*G06N 5/00* (2023.01)
*G06N 20/00* (2019.01)
*G06Q 10/0631* (2023.01)
*G06N 5/04* (2023.01)
*G06Q 10/0639* (2023.01)

(52) U.S. Cl.
CPC ....... *G06Q 10/063116* (2013.01); *G06N 5/04* (2013.01); *G06N 20/00* (2019.01); *G06Q 10/06393* (2013.01)

(58) Field of Classification Search
CPC .......................................... G06Q 10/00–50/00

USPC ....................................................... 705/7.16
See application file for complete search history.

(56) References Cited

U.S. PATENT DOCUMENTS

| | | | | |
|---|---|---|---|---|
| 6,738,736 B1* | 5/2004 | Bond | ..................... | G06Q 10/10 703/2 |
| 8,041,797 B2* | 10/2011 | Childress | ............... | G06Q 10/06 370/254 |
| 10,521,811 B2* | 12/2019 | Rai | ................ | G06Q 10/063112 |
| 2005/0256946 A1* | 11/2005 | Childress | ............... | G06Q 10/06 709/223 |

(Continued)

FOREIGN PATENT DOCUMENTS

WO    WO-2020110131 A1 *    6/2020

*Primary Examiner* — Mustafa Iqbal
(74) *Attorney, Agent, or Firm* — Eversheds Sutherland (US) LLP

(57) ABSTRACT

Embodiments of the present disclosure provide methods, systems, apparatuses, and computer program products for network resource allocations. An example method may include receiving performance data associated with customer premise devices and nodes. The method may include determining a first amount of technician resources allocated to a first geographic area. The method may include determining a second amount of technician resources allocated to a second geographic area. The method may include determining a first score indicative of a first predicted demand for technician resources associated with the first geographic area, and a second score indicative of a second predicted demand for technician resources associated with the second geographic area. The method may include causing a third amount of technician resources to be allocated to the first geographic area and a fourth amount of technician resources to be allocated to the second geographic area.

20 Claims, 11 Drawing Sheets

(56) References Cited

U.S. PATENT DOCUMENTS

| | | | |
|---|---|---|---|
| 2009/0018812 A1* | 1/2009 | Kothari | G06Q 10/04 |
| | | | 703/22 |
| 2009/0199192 A1* | 8/2009 | Laithwaite | G06Q 10/109 |
| | | | 718/104 |
| 2015/0106143 A1* | 4/2015 | Rai | H04L 41/5051 |
| | | | 705/7.14 |
| 2019/0303211 A1* | 10/2019 | Dias | G06N 20/20 |
| 2020/0411168 A1* | 12/2020 | Thomas | G06Q 10/06311 |
| 2020/0411170 A1* | 12/2020 | Brown | G06N 20/00 |
| 2021/0132947 A1* | 5/2021 | John | G06F 9/5072 |
| 2022/0210028 A1* | 6/2022 | Chen | H04L 41/0896 |
| 2022/0292542 A1* | 9/2022 | Kaspar | G06F 18/2148 |

\* cited by examiner

800 ⤹

802
Determine, based on device performance data, using one or more machine learning models, a first score associated with a first node, the first score indicative of a first predicted demand for technician resources associated with a first geographic area including the first node, wherein the first predicted demand for technician resources is associated with a first time period

804
Determine an amount of technician resources allocated to the first geographic area during the first time period

806
Determine a difference between the first predicted demand for technician resources and the amount of technician resources

808
Determine, based on the difference, a second score associated with the first node

810
Train the one or more machine learning models based on the second score

FIG. 8

SYSTEMS AND METHODS FOR NETWORK RESOURCE ALLOCATIONS

TECHNICAL FIELD

This disclosure generally relates to systems and methods for managing resources and, more particularly, to allocating network resources.

BACKGROUND

A wide variety of network service providers may provide services to customer-premises equipment (CPE) using one or more networks. When service disruptions occur, technicians may be dispatched to adjust one or more CPEs and other equipment. However, some devices may not receive timely support, thereby resulting in reduced user experience. For example, insufficient resources may be allocated to a particular area to service network devices and CPE, so when service issues occur, there may be a delay in responding to the disruptions. Therefore, enhanced network resource management may be needed.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 8 depicts an example flow diagram for a process for network resource allocation, in accordance with one or more example embodiments of the present disclosure.

DETAILED DESCRIPTION

Overview

Figure 1:
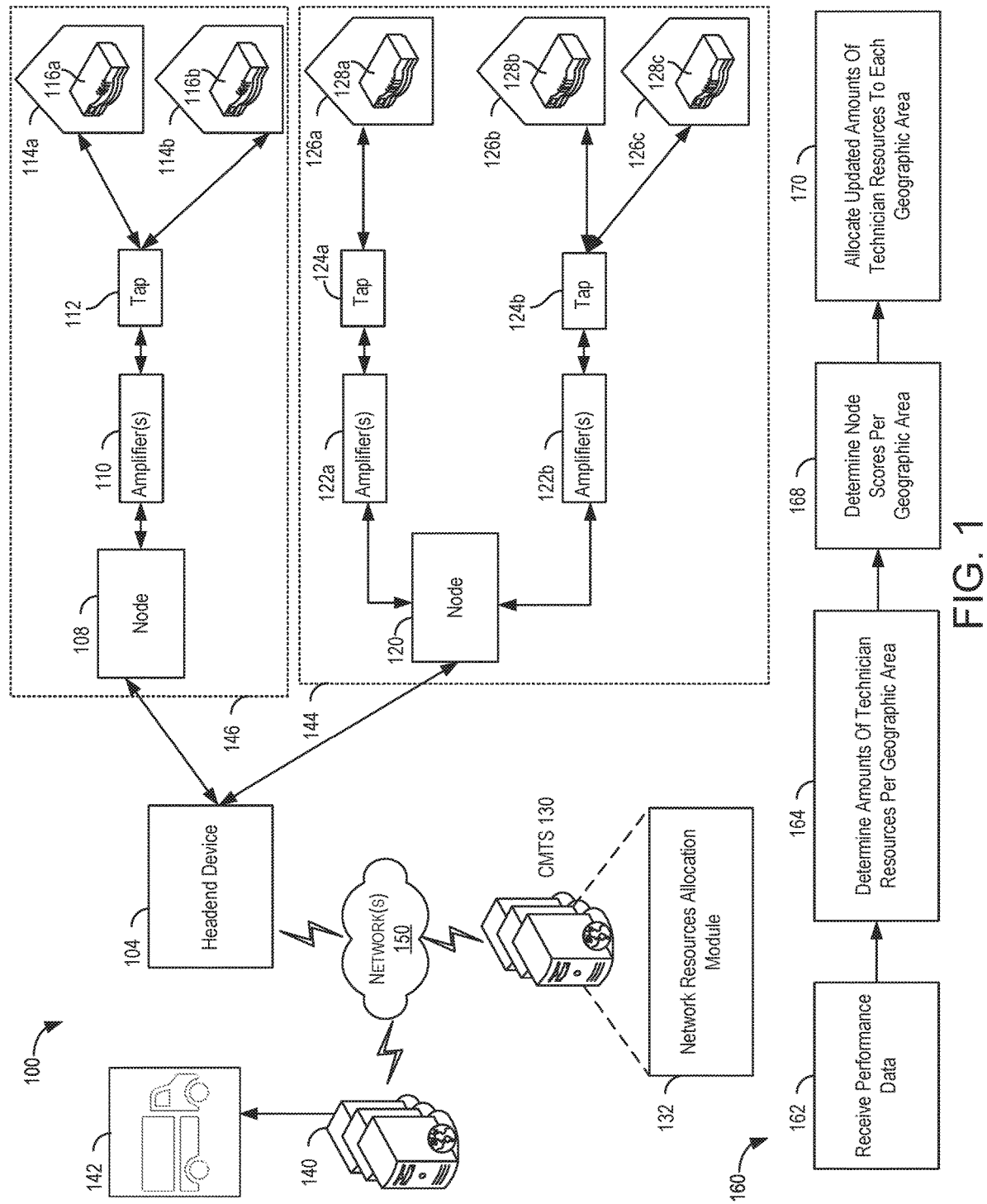
FIG. 1 depicts an illustrative system for network resource allocation in a cable network, in accordance with example embodiments of the disclosure.

The disclosure generally relates to network resource allocations. In some embodiments, the disclosure may more specifically relate to network resource allocations (e.g., technician resource allocation) on data over cable service interface specification (DOCSIS) networks.

A wide variety of network service providers may establish communication networks to connect customer-premises equipment or customer-provided equipment (CPE) to one or more networks, such as DOCSIS networks. For example, a geographic area, such as a neighborhood or zip code, may have one or more devices (e.g., nodes, taps, amplifiers, etc.), each of which may provide services (e.g., television, Internet, phone, etc.) to CPE of multiple residences. A node may be a device between a headend and CPE of multiple customer residences. A node may be capable of creating, receiving, or transmitting information over a communications channel in a cable network as either a redistribution point or a communication endpoint. A tap may be a hardware device capable of monitoring events associated with CPEs on a local network. A tap may directly connect with the CPEs, and a node may connect with multiple taps to communicate with the CPEs. Deploying and maintaining communication networks with nodes and CPE may require reliable communication between devices and systems, and may require efficient allocation of resources, both computer-based and human technicians, to respond to poor system performance and service disruptions. For example, technicians may be dispatched to geographic locations where network issues have occurred to adjust one or more amplifiers, nodes and/or tap devices that are connected to the CPEs to fix network and device issues in order to maintain reliable communications between the CPEs (e.g., cable modems, access points, etc.) and other components of the network. A technician may be pre-assigned to a geographic area to provide support for network components and CPEs. However, sometimes devices in some geographic areas may perform well and may not need much support for network troubleshooting as expected, but devices in other geographic areas may need more support than expected. The result may be that technicians in some geographic areas are overwhelmed by service calls, and customers may not receive timely technician support. Therefore, there may be a need for enhanced network resource allocations.

Example aspects of the present disclosure are directed to methods and systems for allocating network resources (e.g., technician resources and computer-based resources) automatically, dynamically, timely, and efficiently by utilizing a set of network performance metrics. In particular, a system may determine network issues (e.g., intermittent issues, chronic issues, node outage, anomalous behavior of nodes, and/or sudden changes in performance of nodes) based on network performance metrics (e.g., signal-to-noise ratio, radio-frequency signal quality, power level to a device, packet loss, customer dispositions, existing service tickets, etc.), and the system may predict demands of technician resources for solving the network issues. In particular, the system may have access to CPE-level (e.g., as identified by medium access control addresses of individual CPE) performance metrics, and may identify and predict performance issues (e.g., performance not meeting criteria, such as not satisfying one or more thresholds) for a node based on the performance metrics associated with the CPE that communicate with the given node. Based on the CPE service performance issues of one or more nodes, the system may determine which geographic areas need more or less technicians before service performance issues may arise, and may auto-generate service tickets and re-allocate resources to different geographic areas.

In some embodiments, the system may prioritize nodes based on the predicted demands for technician resources, and the system may automatically allocate technician resources to geographic areas where the nodes having the network issues are located based on the priorities of the nodes. Additionally, and/or alternatively, the system may send information about the network issues associated with the nodes to the technicians such that the technicians may better understand what service or repairs may be helpful for the nodes. The system may allocate technicians to geographic areas based on the particular types of service or repairs are needed or predicted at one or more nodes and based on the type or skill of any service technician. Using one or more machine learning models as described herein, the system may identify service issues, determine optimal resource capacity for given geographic areas, prioritize nodes, and allocate resources based on the node priority.

In some embodiments, a network (e.g., a DOCSIS network) may include a headend device that connects to one or more CPEs (e.g., cable modem devices, access points, and any other relevant CPEs) via one or more nodes. The system may request performance data from the headend device and/or other network devices at a first time interval (e.g., every 15 minutes) and/or from other devices (e.g., nodes, CPE, data centers, etc.) at a second time interval (e.g., every 2 hours). The performance data may be collected from individual CPE. The system may input the performance data into a network resource allocation model (e.g., a machine learning model) of the system. The network resource allocation model of the system may output one or more node scores, each score indicative of a predicted demand-based priority of technician resources associated with a particular node within a geographic area. A highest node priority level (e.g., a highest node score) may indicate the greatest predicted demand of technician resources (e.g., from among multiple nodes). A lowest priority level may indicate the least predicted demand of technician resources. A higher priority node may be allocated more resources than a lower priority node based on the respective resource demand of the nodes. For example, a first group of nodes that have received troubleshooting calls from customers, work orders, and/or tickets associated with poor signal strength of CPEs may have the higher priority level than a second group of nodes that have repeated network intermittent issues, chronic issues, tickets associated with network intermittent issues, and/or are most likely to be completely off. The second group of nodes may have the higher priority level than a third group of nodes that have anomalous behaviors, sudden changes in network health, and/or less likely to be completely off. As another example, a first node may be associated with a greater number of CPE devices than a second node. The system may determine that the first node may have a higher priority level than the second node.

In some embodiments, if a first score associated with a first node is greater than a second score associated with a second node, indicative of a first predicted demand of technician resources associated with the first node is greater than a second predicted demand of technician resources associated with the second node, the system may allocate more technician resources at a first geographic area that includes the first node than a second geographic area that includes the second node. In this manner, geographic areas whose nodes may experience higher demand may be allocated more resources than geographic areas whose nodes experience lower demands, and by continuously evaluating the node demand, the system may adjust resource allocations to respond to predicted demand of technician resources and actual service calls.

In some embodiments, the system may make an adjustment to previously allocated resources associated with a node based on node scores. For example, based on the node scores, the system may determine that devices (e.g., CPEs, node devices, tap devices, and/or other components in the network) in a geographic area associated with the node may perform well and may not need as much support for network troubleshooting as expected, such as the system may determine that the predicted demand of technician resources associated with geographic area is less than an amount of technician resources that have been allocated to that geographic area (e.g., a current allocation). The system may reduce the amount of the technician resources associated with the geographic area to allow for re-allocating some resources to another geographic area whose one or more nodes may be predicted to experience greater than usual service technician demand. As another example, based on the node scores, the system may determine devices in that geographic area may need more support than expected, such as the system may determine the predicted demand of technician resources is greater than the amount of technician resources that have been allocated. The system may increase the amount of technician resources for the geographic area accordingly. Using continual learning, the system may adjust prediction criteria used for node scoring when actual demand is significantly different than (e.g., more than a threshold amount than) the predicted demand. For example, when a predicted allocation is significantly more or less than the actual demand that occurs (e.g., based on the number of service calls and/or service tickets generated), the system may modify the threshold amounts used to determine whether performance data indicates increased or decreased technician service demand.

The performance data may include identification data (e.g., a MAC address for individual CPE, a device status, a device DOCSIS profile, a channel frequency, a modulation profile, a modulation type, a channel width, and/or any relevant data for identifying a device in a cable network), forward error correction information, upstream/downstream data transfer rates, signal to noise ratios (SNRs), modulation error ratios, measurement data to characterize one or more channels associated with signals outputted by CPEs (e.g., slopes measurement data, amplitude measurement data, ripple measurement data, spike (for example, non-linear noise distortions) measurement data, absolute received power per subcarrier measurement data, error vector magnitude measurement data, and the like), device power levels, cable modem termination system (CMTS) power levels, a CMTS equalization coefficient, a device equalization coefficient, and/or any relevant data associated with a performance of the above devices. The CMTS equalization coefficient and device equalization coefficient may relate to the pre-equalization of devices within the DOCSIS network. Pre-equalization may be a DOCSIS feature that may improve upstream performance in the presence of network impairments. At a high level, pre-equalization is performed as follows. First, a first device (for example, a CMTS)

analyzes messages coming from a second device (for example, a cable modem) and evaluates the signal quality of the messages. If the first device determines that the messages can be improved by pre-equalization, the first device sends equalizer adjustment values to the second device. The second device applies these equalizer adjustment values, called coefficients, to its pre-equalizer. The result is that the second device may then transmit a pre-distorted signal to compensate for impairments between the second device and the first device. As the pre-distorted signal traverses the network it will experience the effects of radio frequency (RF) impairments. By the time the pre-distorted signal from the second device arrives at the first device, it will no longer have any of the original pre-distortion, as the RF impairments will have transformed it back into a near-ideal signal at the first device. If further adjustments are required, the first device may send more pre-equalizer coefficient values to the second device and the cycle may repeat. With this in mind, in some instances, the CMTS equalization coefficient may be an equalization coefficient used by a CMTS for data transfer from the CMTS to another device, and the device equalization coefficient may be an equalization coefficient used by a device.

In some embodiments, given performance data associated with a single node, the network resource allocation model of the system may output a single score for that node. The single score may represent a priority level associated with the single node, the priority level based on a predicted demand for that single node. In some embodiments, given performance data associated with multiple nodes, the network resource allocation model of the system may output a list of scores (e.g., a ranking of nodes), a score associated with a respective node of the multiple nodes. A node score may represent a predicted priority level indicative of a predicted demand of technician resources for a given node. In particular, for any time period, the system may rank/prioritize nodes based on a predicted technician service demand. For example, a higher ranked node may indicate a node with higher predicted demand than a node with a lower rank (e.g., score). Based on the priority of nodes, the system may allocate resources to the geographic areas in which nodes are located.

In some embodiments, a network resource allocation model of the system may include one or more machine learning models (e.g., a regression machine learning model, a supervised machine learning model, a semi-supervised machine learning, a reinforcement learning model, and/or some combination thereof). In some embodiments, the network resource allocation model may include multiple machine learning models. For example, the network resource allocation model may include an anomaly detection model to detect performance anomalies and group nodes based on the performance data, a capacity optimization model to determine optimal resource amounts for respective geographic areas, and a node prioritization model to determine the node rankings and generate resource allocations.

In some embodiments, the anomaly detection model may include one or more machine learning models to predict and/or identify an occurrence of service performance events (e.g., a node outage may occur, an intermittent network issue has occurred for a node, a chronic/consistent network issue has been occurring for a node, or the like) and/or a classification/label associated with the service performance event (e.g., intermittent, consistent, completely off, or the like). Service performance events may include service performance issues defined by performance data, such as SNR being below a threshold, power level being below a threshold, packet loss exceeding a threshold, customer dispositions and/or service tickets exceeding a threshold, etc. A node outage event may describe that a node is completely off after a node experiences a chronic issue initially manifesting intermittent network issues, such as a node may intermittently go down and recover multiple times over a course of a given time period before the node is completely off. Intermittent events may be classified when CPE of a node experience a threshold number of events during multiple non-continuous time periods. Chronic events may be classified when CPE devices experience a threshold number of events over multiple continuous time periods. In some embodiments, the anomaly detection model may include multiple machine learning models. For example, the anomaly detection model may include a first machine learning model that may predict an occurrence of a node outage event and a chronic event, and a second machine learning model may determine a classification/label associated with the node based on the type and/or frequency of the events occurring at the node.

In some embodiments, the first machine learning model may receive performance data associated with a node and may output a value indicative of a probability of the occurrence of the node outage event and chronic event and/or a particular time period when the node outage event and/or chronic event (e.g., a recurring event) may occur. For example, the first machine learning model may receive performance data that may be obtained from CPEs (e.g., CM devices) every 2-4 hours (or using another time increment). The first machine learning model may utilize random forest based regression techniques (or other regression techniques) to generate a regression result indicative of predicted performance data at one or more future time periods and output a value indicative of a probability of the occurrence of the node outage event and chronic event and a corresponding time period when the node outage event and chronic event may occur based on the regression results. The first machine learning model may be trained using training data. The training data may include historical performance data over multiple time periods, historical data (e.g., customer calls, service tickets, or the like) associated with node outages and chronic issues caused by the historical performance data, expected outputs associated with the historical performance data and historical data associated with node outages and chronic issues.

The second machine learning model may receive performance data associated with a node and may output a classification associated with a frequency at which a service performance event occurs at the node. For example, the second machine learning model may receive performance data that may be obtained from a headend device at a time period (e.g., every 15 minutes) and/or from an external source. The second machine learning model may break up a day into clusters (e.g., time windows) of hours (e.g., a first time window [9 PM-3 AM], a second time window [3 AM-9 AM], a third time window [9 AM-3 PM], and a fourth time window [3 PM-9 PM]). The second machine learning may analyze performance data of CPEs during each cluster of hours and predicts performance issues and/or performance events for nodes during each cluster of hours based on Gaussian mixture model (GMM) clustering techniques, hierarchical clustering techniques, and/or combinatorial clustering techniques. For example, signal decomposition may be performed on the performance data such that the performance data is decomposed into time and frequency domain. The second machine learning model may identify distinct signal signatures based on the decomposed performance data and may classify the distinct signal signatures into three different classifications based on frequency of events that occurred during a respective cluster of hours (e.g., a first classification of healthy nodes—nodes not experiencing events during any cluster of hours, a second classification of nodes having intermittent noise—nodes experiencing events during some, but not all, clusters of hours, and a third classification of consistently bad nodes—nodes experiencing events during most or all clusters of hours). For nodes classified as having intermittent noise, the second machine learning model may predict a time of day when a classified node may need service based on the clusters of hours during which the intermittent noise node has experienced events in the past. The training data used for the model may include historical performance data over multiple time windows, historical data (e.g., customer calls, service tickets, or the like) associated with service performance events corresponding to the historical performance data, expected classification associated with the historical performance data, and historical data associated with service performance events.

In some embodiments, the capacity optimization model (e.g., an optimization model, a machine learning model, or any relevant model for optimizing service technician/ticket capacity) may receive data associated with technician resources and geographic areas, and may output an optimal amount of technician resources (e.g., maximum and/or a minimum amount of technician resources) for each geographic area across a cable network. Example data associated with technician resources and geographic areas may include work schedules associated with technicians for each geographic area, work skills associated with the technicians for each geographic area, technician sources previously allocated for each geographic area, tasks previously assigned to the technicians for each geographic area. In some embodiments, the system may determine a capacity threshold indicative of a maximum and/or a minimum amount of technician resources for each geographic area across a cable network. The capacity optimization model may determine, based on a current volume of service tickets in any geographic area, a predicted volume of service tickets in any geographic area, and/or the available technicians in any geographic area, an optimal service ticket volume threshold for the geographic area. For example, given a number and types of service tickets in any geographic area, and given the work schedules and skills of available technicians, the capacity optimization model may determine the optimal amount of tickets that may be serviced by available technicians in any geographic area. In some embodiments, the capacity optimization model may determine the optimal service ticket volume based on predicted volume of service tickets in any geographic area. The predicted volume and types of service tickets may be determined based on the anomaly detection model. For example, the predicted volume and types of service tickets associated with node outage event and chronic event and/or a particular time period when the node outage event and/or chronic event may occur may be determined based on the first machine learning model (e.g., a proactive network diagnosis model) of the anomaly detection model. The predicted volume and types of service tickets associated with nodes having intermittent noise and consistently bad nodes may be generated based on the second machine learning model (e.g., a node classification model) of the anomaly detection model. In this manner, when the optimal number of tickets is exceeded by the predicted demand of a node, the system may allocate more technician resources to the node.

The node prioritization model of the system may receive outputs from the anomaly detection model and the capacity optimization model as inputs (e.g., ticket volume thresholds for geographic areas as determined by the capacity optimization model, node clusters and classifications from the anomaly model, etc.). Other inputs to the node prioritization model may include pending service trouble (e.g., event) calls, work orders, service tickets, repeat service tickets, performance metrics indicating anomalous node behavior, and performance metric indicating sudden changes in network health. In some embodiments, the node prioritization model may receive assignment data associated with a node as an input, e.g., troubleshooting calls that have been received from customers, work orders that have been placed for the node, tickets that have been created for the node, or the like. The node prioritization model may output one or more scores (e.g., priority rankings), each score indicative of a predicted demand of technician resources associated with a particular node at a geographic area. In some embodiments, the network resource allocation model may be a machine-learned ranking model, such as a supervised machine learning model, a semi-supervised machine learning, a reinforcement learning model, or any relevant machine learning model for ranking. For example, nodes with more service tickets, trouble calls, and/or predicted service events may be given a higher score than nodes with fewer service tickets, trouble calls, and/or predicted service events. In this manner, node scores represent demand-based priorities of respective nodes based on actual and anticipated service technician demand.

In some embodiments, the node prioritization model may cause generation of a service ticket for a node based on the node scores and the associated node demand. A service ticket may describe information indicative of a predicted or detected event (e.g., a description of an issue, a corresponding node and/or geographic area, a priority level, and/or any relevant data associated with the determined event). The node prioritization model may send the service tickets to technicians or indicate to another system to generate service tickets to send to technicians.

In some embodiments, a network resource allocation model of the system may include a single model (e.g., a combination of the models described above), or multiple models as described above. Inputs of the network resource allocation model may include performance data, data associated with technician resources that have been determined for geographic areas, and assignment data indicative of assignments that have been assigned to the geographic areas. Outputs of the network resource allocation model may be similar to the outputs of the node prioritization model, such as one or more scores, each score indicative of a predicted demand of technician resources associated with a particular node at a geographic area. The network resource allocation model may cause generation of a service ticket for a node.

In some embodiments, the system may generate a feedback loop to retrain the network resource allocation model. For example, during a time period, the system may generate a predicted demand of technician resources for a geographic area associated with a node. After the prediction, the system may determine an actual amount of technician resources that have been allocated to that geographic area during the same time period. The system may determine a difference between the predicted demand of technician resources and the actual amount of technician resources. The difference may be caused by one or more adjustments to the predicted demand of technician resources according to capacity thresholds, actual network issues, pre-existing technician resources, and tasks, or any relevant factors that may change the predicted demand of technician resources. The system may adjust, based on the difference, one or more parameters of the network resource allocation model to generate an updated score that is close to an actual priority level associated with the node.

In some embodiments, the system may automatically allocate technician resources based on the predicted demand of technician resources, predicted network issues, and/or optimal amounts of technician resources. For example, the system may determine an amount of technician resources that will be allocated to a geographic area associated with a node, such as work schedules associated with technicians that will be allocated to the geographic area, work skills associated with the technicians that will be allocated to the geographic area, tasks associated with the technicians that will be allocated to the geographic area, or the like. For example, an experienced technician may be assigned to a geographic area where devices (e.g., nodes, taps, and/or CPEs) have a severe issue, an unusual issue, and/or a significant amount/frequency of issues. A technician work schedule may be different for a geographic area where issues occur more frequently than a technician work schedule for another geographic area that experience or are predicted to experience fewer issues. In this manner, the system dynamically may adjust resources based on actual and predicted demand for technician service at multiple nodes.

In some embodiments, the system may compare the determined amount of technician resources with one or more capacity thresholds, the system may generate an updated amount of technician resources based on the comparison. The system may allocate the determined amount of technician resources to a particular geographic area associated with a specific node, if the determined amount of technician resources falls within a capacity range defined by a first capacity threshold (e.g., a minimum amount of technician resources) and a second capacity threshold (e.g., a maximum amount of technician resources). The system may reduce the determined amount of technician resources and allocate the reduced amount of technician resources, if the determined amount of technician resources is less than the second capacity threshold. For example, two or more technicians may be replaced by a single technician. The system may increase the determined amount of technician resources and allocate the increased amount of technician resources, if the determined amount of technician resources is greater than the first capacity threshold.

In some embodiments, the system may allocate the technician resources to a specific device based on a number of devices (e.g., nodes, taps, and/or CPEs) located in that geographic area and/or associated radio frequency (RF) signal quality. For example, within a geographic area, multiple CM devices may experience poor RF signal quality. Based on the performance data, the system may determine that a first group of CM devices of the multiple CM devices may communicate with a first common amplifier and a second group of the CM devices of the multiple CM may communicate with a second common amplifier. The system may determine that the number of the first group of CM devices is greater than the number of the second group of CM devices. Additionally, and/or alternatively, the system may determine a signal quality associated with the first group of CM devices may be lower than a signal quality associated with the second group of CM devices. In some embodiments, the system may determine the signal quality associated with the first group of CM devices is below a signal quality threshold and the signal quality associated with the second group of CM devices is above the signal quality threshold. The system may determine a higher priority level for the first common amplifier than the second common amplifier in that geographic area. The system may send a technician to a location of the common amplifier to adjust signals, instead of sending a technician each time to a location of a CM device experiencing poor RF signal quality. Thus, within a predetermined labor hour (e.g., one labor hour), the system may allow technicians fixing issues for multiple CM devices in parallel, instead of fixing issues from CM devices one by one, thereby, working efficiency may be improved.

Particular embodiments of the subject matter described herein can be implemented to realize one or more of the following advantages. The system may not only predict demands of technician resources for geographic areas associated with nodes to prioritize the locations for technician resources allocation, but also may facilitate the sending of information about network events associated with the nodes to the technicians such that the technicians may better understand what actions to perform to service the nodes. In addition, the system may allocate technician resources and solve network issues timely, efficiently, and accurately, thereby, improving network service and customer experience.

Other embodiments of this aspect include corresponding systems, apparatuses, and computer programs configured to perform the actions of the methods encoded on computer storage devices.

The details of one or more embodiments of the subject matter described herein are outlined in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, flexible disk, hard disk, solid-state storage (SSS) (e.g., a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 1 depicts an illustrative system 100 for network resource allocation in a cable network, in accordance with example embodiments of the disclosure. In some aspects, the cable network of the system 100 described herein may be implemented using a DOCSIS specification or equivalent specification. In some embodiments, the cable network may include a fiber optic network that may extend from a headend out to a neighborhood's hub site, and finally to a coaxial cable node which serves customers at several households, for example, but not limited to, 25 to 2000 households. As shown in FIG. 1, a headend device 104 is connected to a first node 108 and a second node 120. The first node 108 connects CPEs (e.g., CM devices, access points, etc.) 116a and 116b at households 114a and 114b via amplifier(s) 110 and a tap 112. The second node 120 connects CPEs 128a, 128b, and 128c at households 126a, 126b, and 126c via amplifiers 122a and 122b and taps 124a and 124b. The headend device 104, a CMTS 130, the nodes 108 and 120, the CPE, and/or a service server 140 (e.g., which processes service requests and customer dispositions, generates service tickets and work orders for technicians 142, etc.) may communicate with each other via one or more communication networks 150.

The headend device 104 may include a CMTS. The headend device 104 may include a converged cable access platform (CCAP) device. CCAP may refer to equipment that combines aspects of the functionality of edge quadrature amplitude modulation (QAM) technology with CMTSs to provide services such as internet and voice over the Internet Protocol (VOIP) while encoding and transmitting digital video channels over the cable network. The headend device 104 may be configured to provide a downstream signal (e.g., a downstream broadband signal) to the CPEs 116a, 116b, 128a, 128b, and 128c, and receive upstream signals from the CPEs 116a, 116b, 128a, 128b, and 128c. For example, the headend device 104 may be configured (i) to receive the downstream signal for a source (not shown in FIG. 1) that may electronically connect the headend device 104, (ii) convert the downstream signal into a radio frequency downstream signal, (iii) output the downstream signal onto the first and second nodes 108 and 120 for communication to the CPEs 116a, 116b, 128a, 128b, and 128c, (iv) receive the upstream signals from the CPEs 116a, 116b, 128a, 128b, and 128c via the first and second nodes 108 and 120, and (v) convert the received upstream signals into light signals for communication to the headend device 104. In some embodiments (not shown in FIG. 1), the headend device 104 may include a switch, for example, a network switch such as an Ethernet switch.

A node (e.g., the first node 108 or the second node 120) may be a device capable of creating, receiving, or transmitting information over a communications channel in a cable network as either a redistribution point or a communication endpoint. As shown in FIG. 1, the first and second nodes 108 and 120 are external to the headend device 104 and between the headend device 104 and the CPE, delivering data from the headend device 104 to many CPE. The first and second nodes 108 and 120 may be electronically connected to the headend device 104 via a cable (e.g., a fiber optic cable). As shown in FIG. 1, the cable network of the system 100 shows one of the embodiments having two node splits corresponding to each of the first and second nodes. In some embodiments (not shown in FIG. 1), the system 100 may include a cable network having X node splits indicating X number of groups are connected to a given node. For instance, the first node 108 may connect a single household having one or more CPEs. The second node 120 may connect to more than two households each having one or more CPEs. Examples of X node splits are further described in FIG. 10. In some embodiments (not shown in FIG. 1), the first node 108 or the second node 120 may include a switch, for example, a network switch such as an Ethernet switch.

The amplifier(s) 110, 122*a* and 112*b* may amplify signals. For example, the amplifier(s) 110, 122*a* and 112*b* may increase the amplitude of signals between the nodes and the CPE. In certain embodiments, the various components of a signal (e.g., low return path, forward path, high return path) may be amplified by respective amplification components of the amplifier(s) 110, 122*a* and 112*b*. Each amplified signal may then be output onto or driven back onto the cable line in a direction for the signal. Any number of diodes or other suitable devices may be incorporated into the amplifier(s) 110, 122*a* and 112*b* in order to prevent or limit undesired leakage of an amplified signal in a direction from which the signal was received. For example, the amplifier(s) 110 may receive a return path signal from the households 114*a* and 114*b* via the tap 112, the amplifier(s) 110 may amplify the signal, and the amplifier(s) 110 may output the signal in an upstream direction towards the headend device 104 while limiting the output or leakage of the signal in a downstream direction. The amplifier(s) 122*a* and 122*b* may have similar structure and perform similar functions to the amplifier(s) 110.

In some embodiments, the amplifier(s) 110, 122*a* and 112*b* may include a wide variety of gains that may be utilized for different components of a signal. In certain embodiments, the amplifier(s) 110, 122*a* and 112*b* may be powered by a received signal, such as a received downstream signal. Additionally or alternatively, the amplifier(s) 110, 122*a* and 112*b* may be powered by one or more batteries and/or external power sources. In certain embodiments, the power requirements of the amplifier(s) 110, 122*a* and 112*b* may be based at least in part on the modulation technique(s) utilized in association with the signals that are amplified. In one example embodiment, a relatively low power amplifier(s) 110, 122*a* and 112*b* may be provided in association with an OFDMA modulation technique. In some embodiments, a variable number of amplifiers may be located between a node (e.g., the first node 108 or the second node 120) and a tap (e.g., the tap 112, 124*a*, or 124*b*).

A tap (e.g., the tap 112, 124*a* or 124*b*) may be a hardware device that may monitor events on a cable network and provide a way to access the data flowing across the cable network. The tap may connect and service any number of households each having one or more CPEs. For example, as shown in FIG. 1, a single tap connects a single household. In some embodiments (not shown in FIG. 1) a single tap may connect more than one household, each having one or more CPEs. The tap may be configured to output the radio frequency downstream signal for receipt by the CPEs that connect to the tap, and direct the communication of the upstream signals to the headend device 104. In some embodiments, the tap (e.g., the tap 112, 124*a* or 124*b*) may be located in a neighborhood including households that connect to the tap to ensure that signal levels or SNR levels associated with the signal are sufficient to transfer data from the households to the tap and/or the headend device 104.

Any number of modulation techniques and/or data standards may be utilized by the cable network of the system 100. For example, television data may be modulated utilizing a suitable quadrature amplitude modulation (QAM) or other modulation technique, and the modulated data may be incorporated into data signal (e.g., broadband data signal). As another example, an orthogonal frequency-division multiple access (OFDMA) technique, a time division multiple access (TDMA) technique, an advanced time division multiple access (ATDMA) technique, a synchronous code division multiple access (SCDMA) technique, or another suitable modulation technique or scheme may be utilized to modulate data included within the data signal. The data signal may be configured to provide a wide variety of services to one or more households, including but not limited to, television service, telephone service, Internet service, home monitoring service, security service, etc.

A CPE (e.g., the CPE 116*a*, 116*b*, 128*a*, 128*b*, or 128*c*) may be any terminal and associated equipment located at a subscriber's premises and connected with a carrier's telecommunication circuit at a point established in a building or complex to separate customer equipment from the equipment located in either the distribution infrastructure or central office of the communications service provider. Examples of a CPE may include CM devices, telephones, routers, network switches, residential gateways (RG), set-top boxes, fixed mobile convergence products, home networking adapters, and Internet access gateways that enable consumers to access providers' communication services and distribute them in a residence or enterprise with a local area network (LAN). In some embodiments, a CPE may be an active equipment, as the ones mentioned above, or passive equipment, such as analog telephone adapters (ATA) or xDSL-splitters (e.g., xDSL refers to the sum total of digital subscriber line (DSL) technologies). The CPEs may provide upstream signals to the headend device 104 via a respective tap, respective amplifiers, and a respective node.

The CMTS 130 may communicate with the headend device 104 and the service server 140 using one or more communication networks 150. The CMTS 130 may be one or more remote cloud-based computers/servers, and/or network-based computers/servers. The CMTS 130 may include a network resource allocation module 132 and one or more relevant modules (not shown in FIG. 1, e.g., communications modules configured to communicate with components inside and outside the CMTS 130).

In one or more embodiments, the one or more communications networks 150 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the one or more communications networks 150 may have any suitable communication range associated therewith and may include, for example, global networks (e.g., the Internet), metropolitan area networks (MANs), wide area networks (WANs), local area networks (LANs), or personal area networks (PANs). In addition, any of the one or more communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The network resource allocation module 132 may be one or more machine learning models used to predict demands of technician resources associated with the first and second nodes 108 and 120 and automatically allocate amounts of technician resources to geographic areas associated with the first and second nodes 108 and 120 (e.g., a geographic area 144 that includes the node 120, a geographic area 146 that includes the node 108). Additionally, and/or alternatively, the network resource allocation module 132 may send service tickets, work schedules, and work zones (e.g., assigned geographic areas) to the technicians 142. In some embodiments, the network resource allocation module 132 may perform an example method 160 for resource allocation.

At block 162, the network resource allocation module 132 (e.g., one or more machine learning models) may receive performance data of the CPE devices (e.g., for individual CPE devices as identified by MAC addresses for the CPE devices). For example, the network resource allocation module 132 may receive performance data from the headend device 104 and/or the CPE devices 116a, 116b, 128a, 128b, and 128c. The performance data may include SNR data, transmission power, packet loss, customer dispositions service tickets, and the like. The network resource allocation module 132 may request performance data from the headend device 104 at a first time interval (e.g., every 15 minutes) and/or from the CPE devices at a second time interval (e.g., every two hours). In some embodiments, the network resource allocation module 132 may further receive data associated with technician resources that have been determined for geographic areas, and/or assignment data indicative of assignments that have been assigned to the geographic areas from the service server 140.

At block 164, the network resource allocation module 132 may determine amounts of technician resources per geographic area (e.g., geographic area 144, geographic area 146). For example, the network resource allocation module 132 may determine a first amount of technician resources that have been allocated to the geographic area 146 in which the first node 108 is located, and determine a second amount of technician resources that have been allocated to the geographic area 144 in which the second node 120 is located.

At block 168, the network resource allocation module 132 may determine node scores (e.g., node rankings indicative of technician service demand-based priority) per geographic area. The network resource allocation module 132 may input the received performance data associated with the first and second nodes 108 and 120, and may output a first score indicative of a first predicted demand of technician resources for the first node 108. The network resource allocation model may output a second score indicative of a second predicted demand of technician resources for the second node 120. The higher the node score, the higher the ranking and priority of the corresponding node may be.

At block 170, the network resource allocation module 132 may allocate updated amounts of technician resources to the geographic areas based on predicted demands of technician resources associated with the first and second nodes 108 and 120. For example, if the first score is less than the second score, indicative of the first predicted demand of technician resources is less than the second predicted demand of technician resources, the network resource allocation module 132 may allocate fewer technician resources to the first geographic than to the second geographic area associated with the second node, or vice versa.

In some embodiments, the network resource allocation module 132 may make an adjustment (e.g., reduce or increase) to technician resources previously allocated to the first and second nodes 108 and 120 based on the first and second scores. For example, when the node 108 has more technician resources allocated to it than the node 120, and updated node scores result in the node 120 having a higher score than the node 108, the network resource allocation module 132 may allocate more resources to the node 120. In some embodiments, the network resource allocation module 132 may use a feedback loop to retrain a network resource allocation model used by the network resource allocation module 132 to score the nodes and allocate resources. In some embodiments, the network resource allocation module 132 may determine technician resources that will be allocated to a geographic area associated with a node, such as work schedules associated with technicians that will be allocated to the geographic area, work skills associated with the technicians that will be allocated to the geographic area, tasks for the technicians to perform based on specific events indicated by the performance data, or the like. In some embodiments, and the network resource allocation module 132 may compare the determined amount of technician resources with one or more capacity thresholds, the network resource allocation module 132 may generate an updated amount of technician resources based on the comparison. For example, a capacity threshold may be indicative of a number of service tickets to which technicians may respond to at a particular node, and the number of technicians needed to be able to respond to a predicted number of service tickets at a node. When determined or predicted resources exceed a capacity threshold for a node, such may indicate that more resources are needed at the node.

In some embodiments, the network resource allocation module 132 may allocate the technician resources to a geographic area based on the predicted demand for the node, the available resources, the specific types of events occurring or expected to occur at a node, and the skills of available technicians. For example, the network resource allocation module 132 may generate service tickets, set work schedules, set geographic areas for technicians, and the like.

Figure 2:
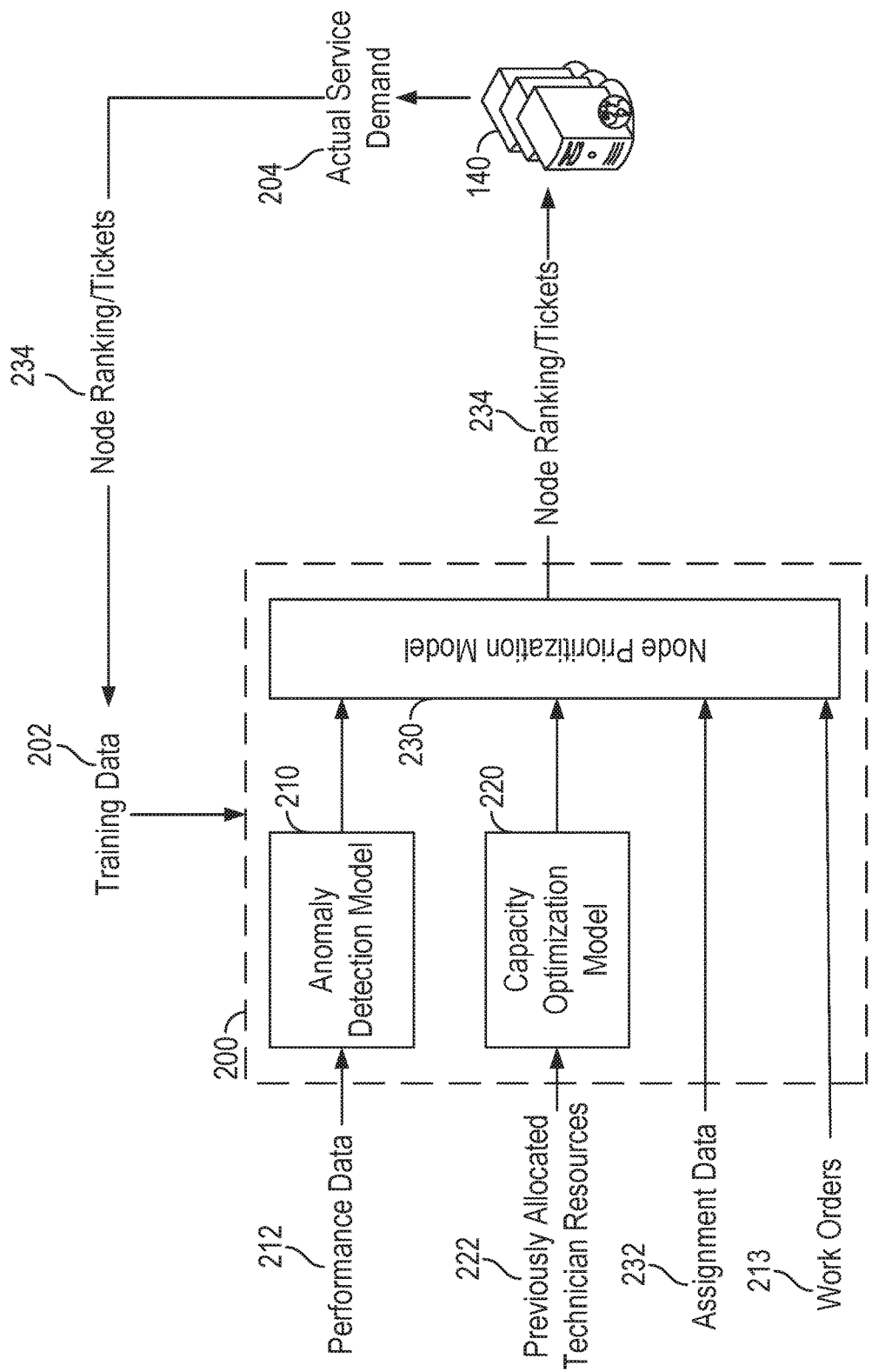
FIG. 2 depicts an example diagram of a network resource allocation model, in accordance with one or more example embodiments of the present disclosure.

FIG. 2 depicts an example diagram of a network resource allocation model 200, in accordance with one or more example embodiments of the present disclosure. The network resource allocation model 200 may be included in the network resource allocation module 132 of FIG. 1. In some embodiments, the resources allocation model 200 may be included in the headend device 104, and/or the service server 140 of FIG. 1. As shown in FIG. 2, the network resource allocation model 200 may include an anomaly detection model 210, a capacity optimization model 220, and a node prioritization model 230.

The anomaly detection model 210 may receive performance data 212 associated with one or more nodes (e.g., the first node 108 and/or the second node 120 in FIG. 1) and may output a value indicative of a probability of an occurrence of an event (e.g., a node outage will occur, an intermittent network issue that has occurred for a node, or the like), and/or may output or a classification associated with the event (e.g., a classification indicative of nodes having been experiencing intermittent network issues, a classification indicative of nodes having experienced intermittent network issues, a classification indicative of nodes will experience a node outage, a classification indicative of a bad node that is completely off, a classification indicative of a healthy node, or the like). Examples of the anomaly detection model 210 are further described in FIG. 3.

The capacity optimization model 220 (e.g., an optimization model, a machine learning model, or any relevant model for optimizing capacity) may receive data 222 associated with previously allocated technician resources and geographic areas, and may output an optimal amount of technician resources (e.g., maximum and/or a minimum amount of technician resources) for each geographic area across a cable network. Example of the data 222 may include work schedules associated with technicians for each geographic area, work skills associated with the technicians for each geographic area, technician sources previously allocated for each geographic area, tasks previously assigned to the technicians for each geographic area. Examples of the capacity optimization model 220 are further shown in FIG. 4.

The node prioritization model 230 (e.g., a regression machine learning model, a supervised machine learning model, a semi-supervised machine learning, a reinforcement learning model, or some combination thereof) may receive outputs from the anomaly detection model 210 and the capacity optimization model 220 and assignment data 232 associated with the nodes (e.g., troubleshooting calls that have been received from customers, work orders that have been placed for the node, tickets that have been created for the node, or the like). The node prioritization model 230 may receive work orders 213, trouble calls, and other indications of existing service needs. The node prioritization model 230 may output a node ranking and/or tickets 234. The node ranking may be represented by one or more scores, each score indicative of a predicted demand of technician resources associated with a particular node at a geographic area, and/or of a priority level associated with the particular node. A ticket may describe information indicative of a predicted event (e.g., a description of an issue, a corresponding node and/or geographic area, a priority level, and/or any relevant data associated with the determined event). The node prioritization model 230 may send the node ranking and tickets 234 to the service server 140 to allocate technician resources to geographic areas associated with the nodes (e.g., the first and second nodes 108 and 120 in FIG. 1). Examples of the node prioritization model 230 are further shown in FIG. 5.

As shown in FIG. 2, the network resource allocation model 200 may receive training data 202 to train the network resource allocation model 200. Training data 202 may include historical performance data per geographic area, associated historical intermittent network issues, chronic issues, and node outage per geographic area, associated historical demand of technician resources per geographic area, historical assignment data per geographic area, historical optimal amount of technicians resources per geographic area, and any relevant data associated with the anomaly detection model 210, the capacity optimization model 220, and the node prioritization model 230.

A feedback loop may be used to train the network resource allocation model 200. For example, during a time period, the network resource allocation model 200 may generate node ranking and tickets 234 that may be represented by a score indicative of a predicted demand of technician resources for a geographic area associated with a node. After the prediction, an actual service demand 204, is indicative of an amount of technician resources that have been allocated to that geographic area during the same time period. The network resource allocation model 200 may determine a difference between the predicted demand of technician resources and the actual service demand 204. The difference may be caused by one or more adjustments to the predicted demand of technician resources according to capacity thresholds, actual network issues, pre-existing technician resources, and tasks, or any relevant factors that may change the predicted demand of technician resources. The network resource allocation model 200 may adjust, based on the difference, one or more parameters of the network resource allocation model to generate an updated a score that is close to an actual priority level associated with the node.

Figure 3:
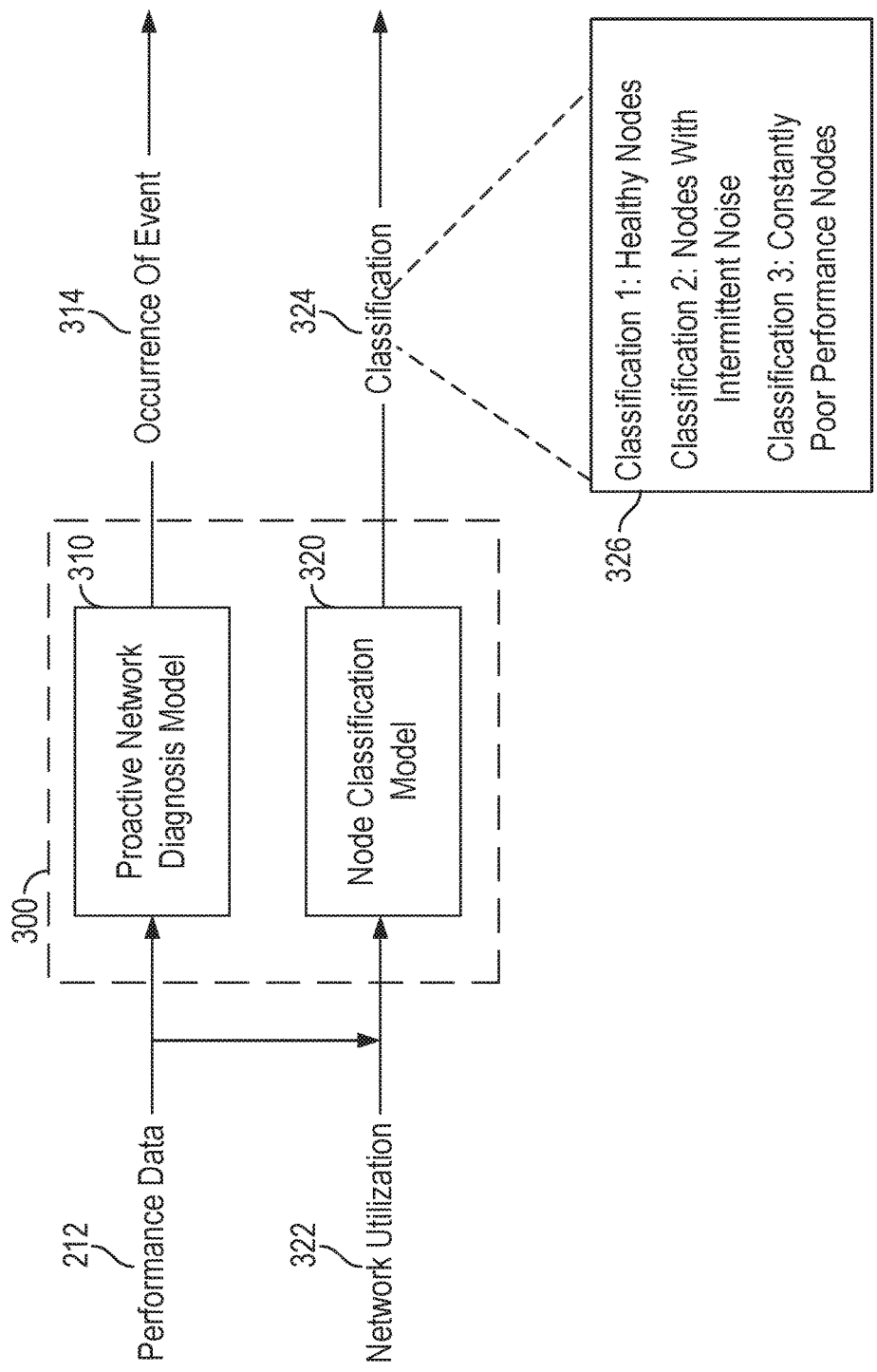
FIG. 3 depicts an example diagram of an anomaly detection model, in accordance with one or more example embodiments of the present disclosure.

FIG. 3 depicts an example diagram of an anomaly detection model 300, in accordance with one or more example embodiments of the present disclosure. The anomaly detection model 300 may be one embodiment of the anomaly detection model 210 of FIG. 2. As shown in FIG. 3, the anomaly detection model 300 may include a proactive network diagnosis model 310 and a classification model 320.

The proactive network diagnosis model 310 may receive performance data 212 and may output a value indicative of a probability of an occurrence of an event 314 associated with a node. A value indicative of a probability of an occurrence of an event 314 may describe a likelihood indicative of how likely is may be that the event may occur (e.g., based on node performance data and the frequency at which events have occurred at a node). Examples of the proactive network diagnosis model 310 may include a regression machine learning model, a supervised machine learning model, a semi-supervised machine learning, a reinforcement learning model, or the like. The proactive network diagnosis model 310 may be trained using historical data associated with historical intermittent network issues, chronic issues, and node outages. Examples of the proactive network diagnosis model 310 may include a regression machine learning model, a supervised machine learning model, a semi-supervised machine learning, a reinforcement learning model, or the like.

The classification model 320 may receive the performance data 212 associated with nodes and network utilization data 322 (e.g., indicative of amounts of traffic at one or more geographic areas) and may output a classification 324 for the node (e.g., a classification indicative of the node experiencing intermittent performance, a classification of the node being healthy and not experiencing performance events, a classification of the node consistently experiencing performance events, etc.). In some embodiments, the classification model 320 (e.g., a machine learning model using clustering techniques) may perform a signal decomposition in a time and frequency domain, and may identify distinct signal signatures based on the decomposed signals and classify the distinct signal signatures into classifications 326. In some embodiments, if the classification model 320 determines that a node is most likely to fall in a classification indicative of nodes having experienced intermittent network issues. The classification model 320 may further predict when the node is most likely to have a node outage resulting from the intermittent network issues. In some embodiments, the classification model 320 may receive performance data from an external source (e.g., a third party system providing the performance data 212).

Figure 4:
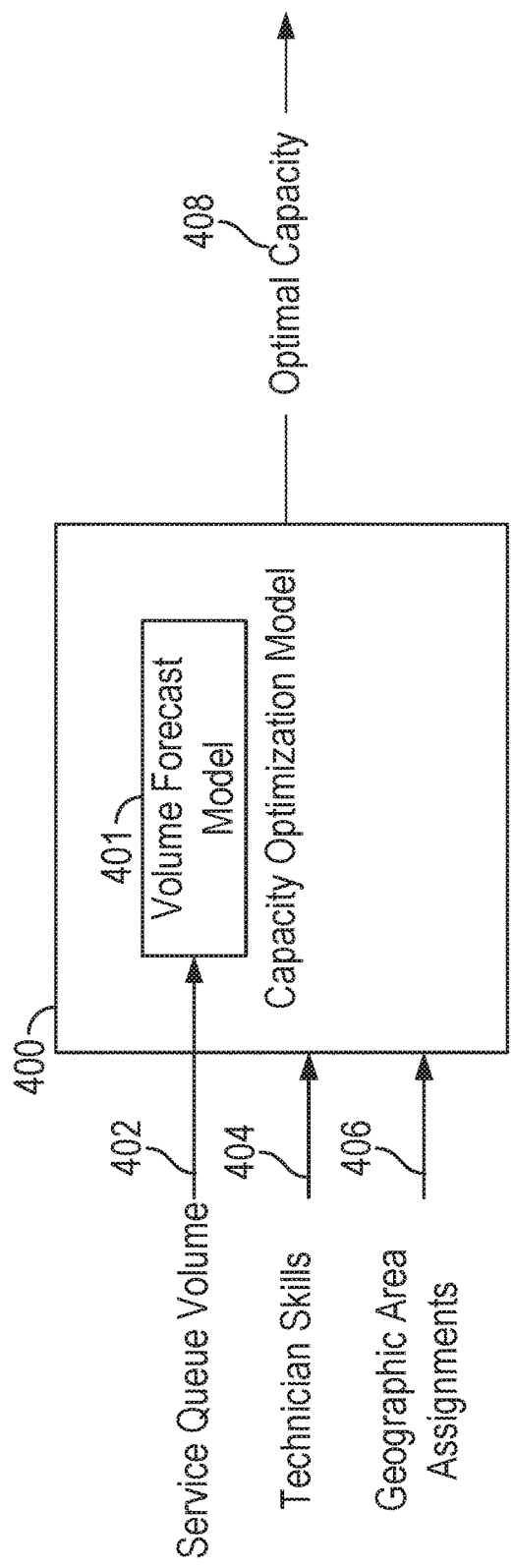
FIG. 4 depicts an example diagram of a capacity optimization model, in accordance with one or more example embodiments of the present disclosure.

FIG. 4 depicts an example diagram of a capacity optimization model 400, in accordance with one or more example embodiments of the present disclosure. In some embodiments, the capacity optimization model 400 may be one embodiment of the capacity optimization model 220 of FIG. 2, and may include a volume forecast model 401 to determine a prediction and forecast for a volume of service-affecting tickets, such as node outage and service call tickets, ensuring the proper amount of resources allocated to any geographic area at a given time. The capacity optimization model 400 (e.g., an optimization model, a machine learning model, or any relevant model for optimizing capacity) may receive service queue volume 402 (e.g., a volume of tickets that have been created), technician skills 404, and geographic area assignments 406 (e.g., tasks previously assigned to the technicians for a geographic area), and may output an optimal capacity 408 indicative of an optimal amount of technician resources (e.g., maximum and/or a minimum amount of technician resources) for each geographic area across a cable network. In some embodiments, the capacity optimization model 400 may determine a capacity threshold indicative of a maximum and/or a minimum amount of technician resources for each geographic area across a cable network.

Figure 5:
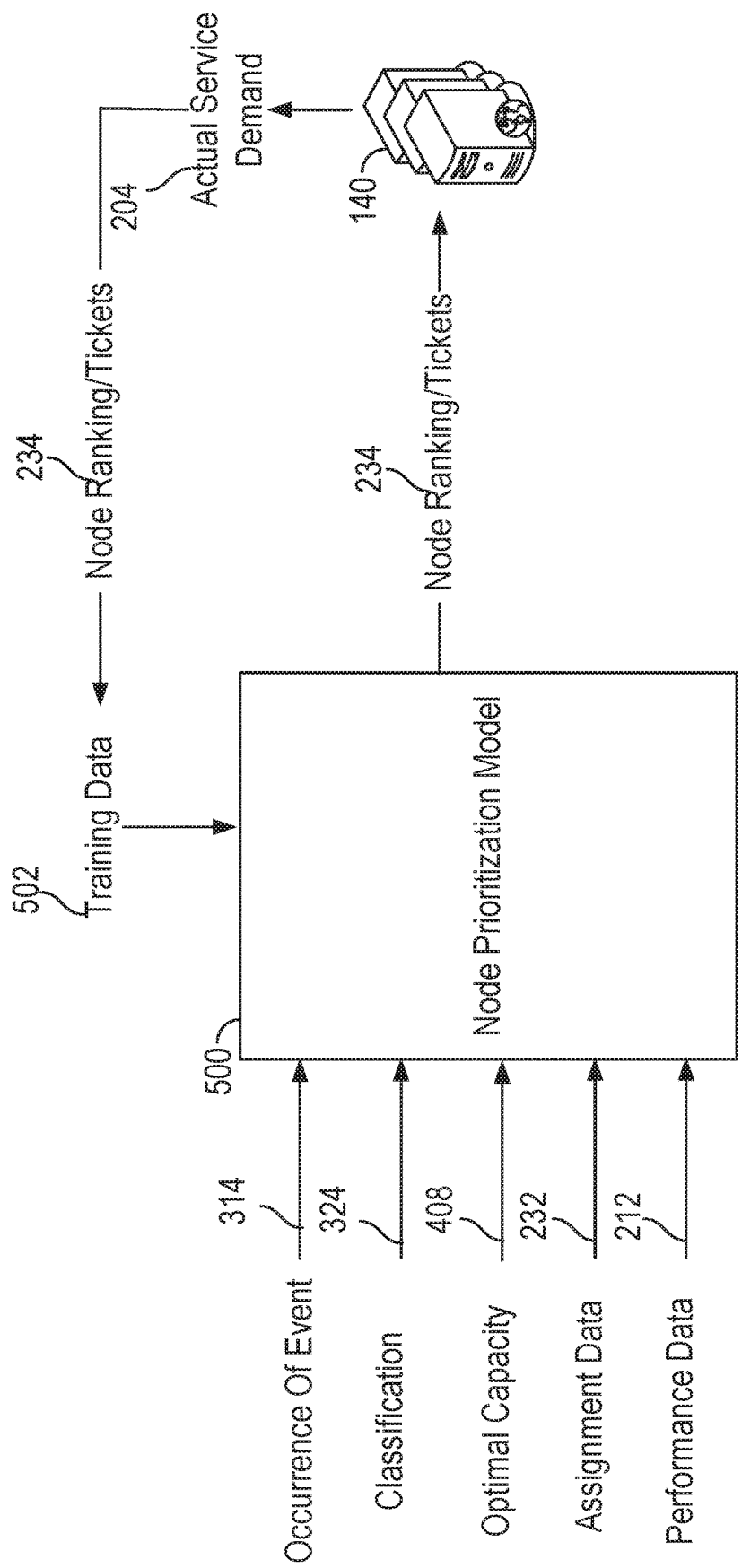
FIG. 5 depicts an example diagram of a node prioritization model, in accordance with one or more example embodiments of the present disclosure.

FIG. 5 depicts an example diagram of a node prioritization model 500, in accordance with one or more example embodiments of the present disclosure. In some embodiments, the node prioritization model 500 may be one embodiment of the node prioritization model 230.

The node prioritization model 500 (e.g., a regression machine learning model, a supervised machine learning model, a semi-supervised machine learning, a reinforcement learning model, or some combination thereof) may receive outputs from the anomaly detection model 210 or 300 (e.g., an occurrence of an event 314 and a classification 324) and the capacity optimization model 220 or 400 (e.g., an optimal capacity 408), and assignment data 232 associated with the TYR5 nodes (e.g., troubleshooting calls that have been received from customers, work orders that have been placed for the node, tickets that have been created for the node, or the like). Additionally and/or alternatively, the node prioritization model 500 may receive the performance data 212. The node prioritization model 500 may output a node ranking and/or tickets 234. The node prioritization model 500 may send the node ranking and tickets 234 to the service server 140 to allocate amounts of technician resources to geographic areas associated with the nodes (e.g., the first and second nodes 108 and 120 in FIG. 1).

As shown in FIG. 5, the node prioritization model 500 may receive training data 502 to train the node prioritization model 500. Training data 502 may include historical performance data per geographic area, historical assignment data per geographic area, associated historical demand of technician resources per geographic area, and any relevant data associated with the node prioritization model 500. In some embodiments, the training data 502 may further include associated historical intermittent network issues, chronic issues, and node outage per geographic area, historical optimal amount of technician resources per geographic area, and any relevant data associated with the anomaly detection model 210 or 300, and the capacity optimization model 220 or 400.

A feedback loop is used to retrain the node prioritization model 500. For example, during a time period, the node prioritization model 500 may generate node ranking and tickets 234 that may be represented by a score indicative of a predicted demand of technician resources for a geographic area associated with a node. After the prediction, an actual service demand 204 indicative of an amount of technician resources that have been allocated to that geographic area during the same time period. The node prioritization model 500 may determine a difference between the predicted demand of technician resources and the actual service demand 204. The difference may be caused by one or more adjustments to the predicted demand of technician resources according to capacity thresholds, actual network issues, pre-existing technician resources and task, or any relevant factors that may change the predicted demand of technician resources. The node prioritization model 500 may adjust, based on the difference, one or more parameters of the network resource allocation model to generate an updated a score that is close to an actual priority level associated with the node.

Figure 6:
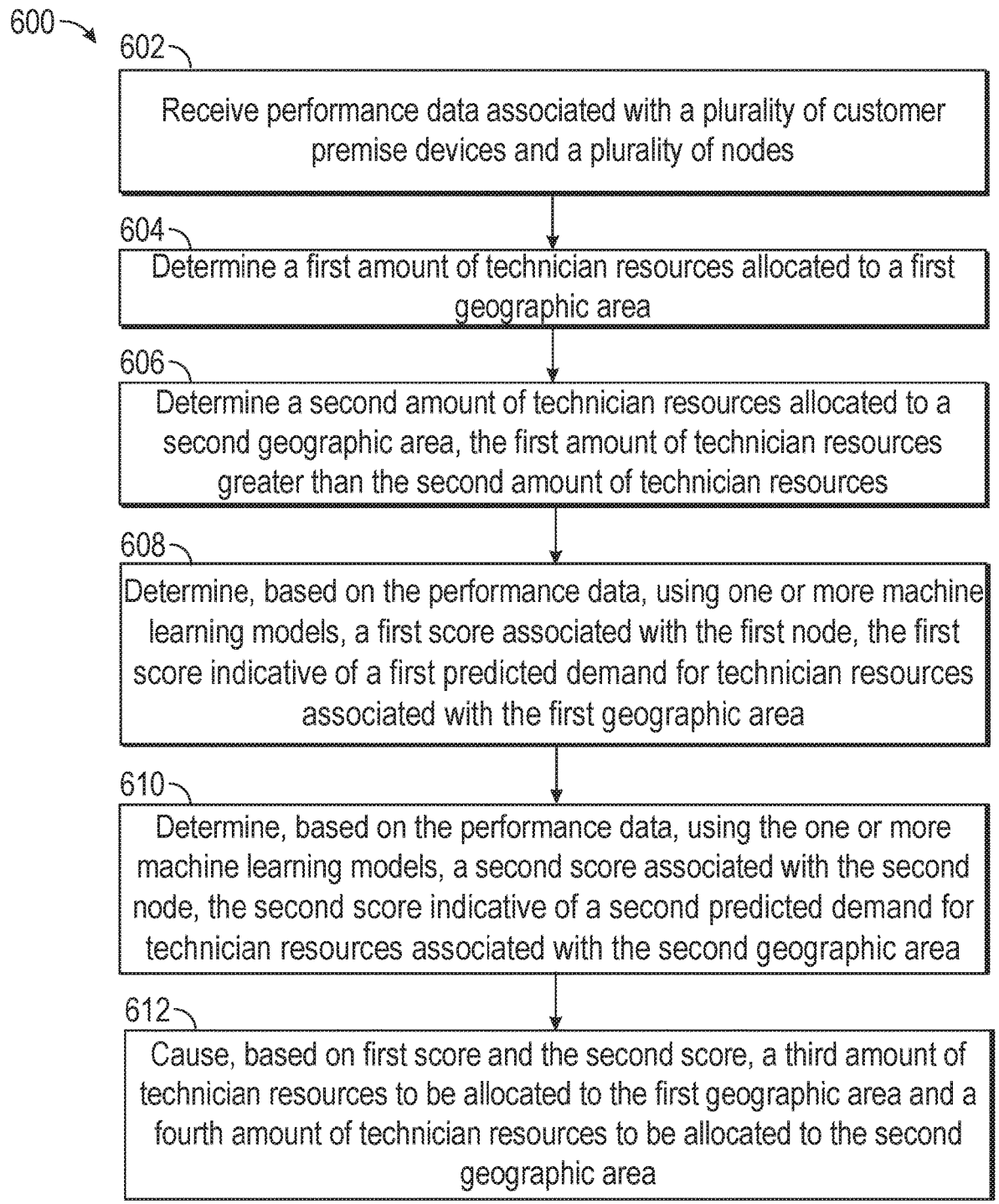
FIG. 6 depicts an example flow diagram for a process for network resource allocation, in accordance with one or more example embodiments of the present disclosure.

FIG. 6 depicts an example flow diagram for a process 600 for network resource allocation, in accordance with one or more example embodiments of the present disclosure.

At block 602, a CMTS system (or device, e.g., the network resources allocation module 132 of FIG. 1) may receive performance data associated with a plurality of customer premise devices and a plurality of nodes. For example, a cable system (e.g., the system 100 in FIG. 1) may include a headend device that connects to one or more cable modem (CM) devices via one more taps and one or more node (e.g., nodes) in a cable network (e.g., a DOCSIS network). Each node may be located within a geographic area. Geographic areas that include the nodes across the cable system may be different. The CMTS system may request performance data from the headend device at a first time interval (e.g., every 15 minutes) and/or from CM device at a second time interval (e.g., every 2 hours). A remote computing server (e.g., a remote cloud-based computer/server, and/or a network-based computer/server) may receive performance data from the headend device and the one or more CM devices. Examples are described above with respect to FIG. 1.

At block 604, the system may determine a first amount of technician resources allocated to a first geographic area. For example, the system may receive data associated with previously allocated technician resources (e.g., the data 222 in FIG. 2). Based on the received data, the system may determine an amount of technician resources that have been allocated to a geographic area associated with a particular node. Examples are described above with respect to FIGS. 1, 2, and 4.

At block 606, the system may determine a second amount of technician resources allocated to the second geographic area. For example, based on the received data above, the system may determine an amount of technician resources that have been allocated to a geographic area associated with a different node. In some embodiments, the first amount of technician resources may be greater than the second amount of technician resources. Examples are described above with respect to FIGS. 1, 2, and 4.

At block 608, the system may determine, based on the performance data, using one or more machine learning models, a first score associated with the first node, the first score indicative of a first predicted demand for technician resources associated with the first geographic area. For example, the system may use a network resource allocation model (e.g., the network resource allocation model 200 in FIG. 2) to determine a score that may also indicate a priority level associated with a geographic area. A highest priority level may indicate the greatest predicted demand of technician resources. A lowest priority level may indicate the least predicted demand of technician resources. For example, a first group of nodes that have received troubleshooting calls from customers, work orders, and/or tickets associated with poor signal strength of CM devices may have the higher priority level than a second group of nodes that have repeated network intermittent issues, chronic issues, tickets associated with network intermittent issues, and/or are most likely to be completely off. The second group of nodes may have the higher priority level than a third group of nodes that have anomalous behaviors, sudden changes in network health, and/or less likely to be completely off. As another example, the second node (e.g., the second node 120 in FIG. 1) may be associated with a greater number of CM devices than the first node (e.g., the first node 108 in FIG. 1). The system may determine that the second node may have a higher priority level than the first node. In some embodiments, given performance data associated with a single node, the network resource allocation model may output a single score for that node. In some embodiments, given performance data associated with multiple nodes, the network resource allocation model may output a list of scores, each score associated with each node of the multiple nodes. Each score may indicate a predicted demand of technician resources associated with each node and/or a priority level associated with each node. Additionally, and/or alternatively, the network resource allocation model may output a ranking list of the multiple nodes. A node ranked at the first place may have the highest priority level, and node ranked at the last place may have the lowest priority level. In some embodiments, a network resource allocation model may include an anomaly detection model, a capacity optimization model and a node prioritization model as described above in FIGS. 2-5. In some embodiments, a network resource allocation model may include a single model to perform similar functions described above with respect to the anomaly detection model, the capacity optimization model, and node prioritization model. Inputs of the network resource allocation model may include performance data, data associated with technician resources that have been determined for geographic areas, and assignment data indicative of assignments that have been assigned to the geographic areas. Outputs of the network resource allocation model may be similar to the outputs of the node prioritization model, such as one or more scores, each score indicative of a predicted demand of technician resources associated with a particular node at a geographic area, and/or of a priority level associated with the particular node. In some embodiments, the network resource allocation model may create a ticket for a node.

At block 610, the system may determine, based on the performance data, using one or more machine learning models, a second score associated with the second node, the second score indicative of a second predicted demand for technician resources associated with the second geographic area. For example, the network resource allocation model may output the second score with the first score together (e.g., simultaneously). As an example, the network resource allocation model may output first score and second score one by one. In some embodiments, the second score may be greater than the first score, indicative of the second predicted demand for technician resources greater than the first predicted demand for technician resources.

At block 612, the system may cause a third amount of technician resources to be allocated to the first geographic area and a fourth amount of technician resources to be allocated to the second geographic area. For example, the system may determine an amount of technician resources that will be allocated to a geographic area associated with a node, such as work schedules associated with technicians that will be allocated to the geographic area, work skills associated with the technicians that will be allocated to the geographic area, tasks associated with the technicians that will be allocated to the geographic area, or the like. The system may allocate the determined amount of technician resources to a corresponding geographic area (e.g., by setting work schedules, assigning technicians to geographic areas, generating service tickets and work orders, etc.). For example, based on the score, the system may determine that the first score is less than the second score, indicating that CM devices in the first geographic area may perform well and may not need much support for network troubleshooting as expected, and the system may determine devices in the second geographic area may need more support than expected. The system may cause resources to be allocated to nodes and/or geographic areas based on the node scores.

Figure 7:
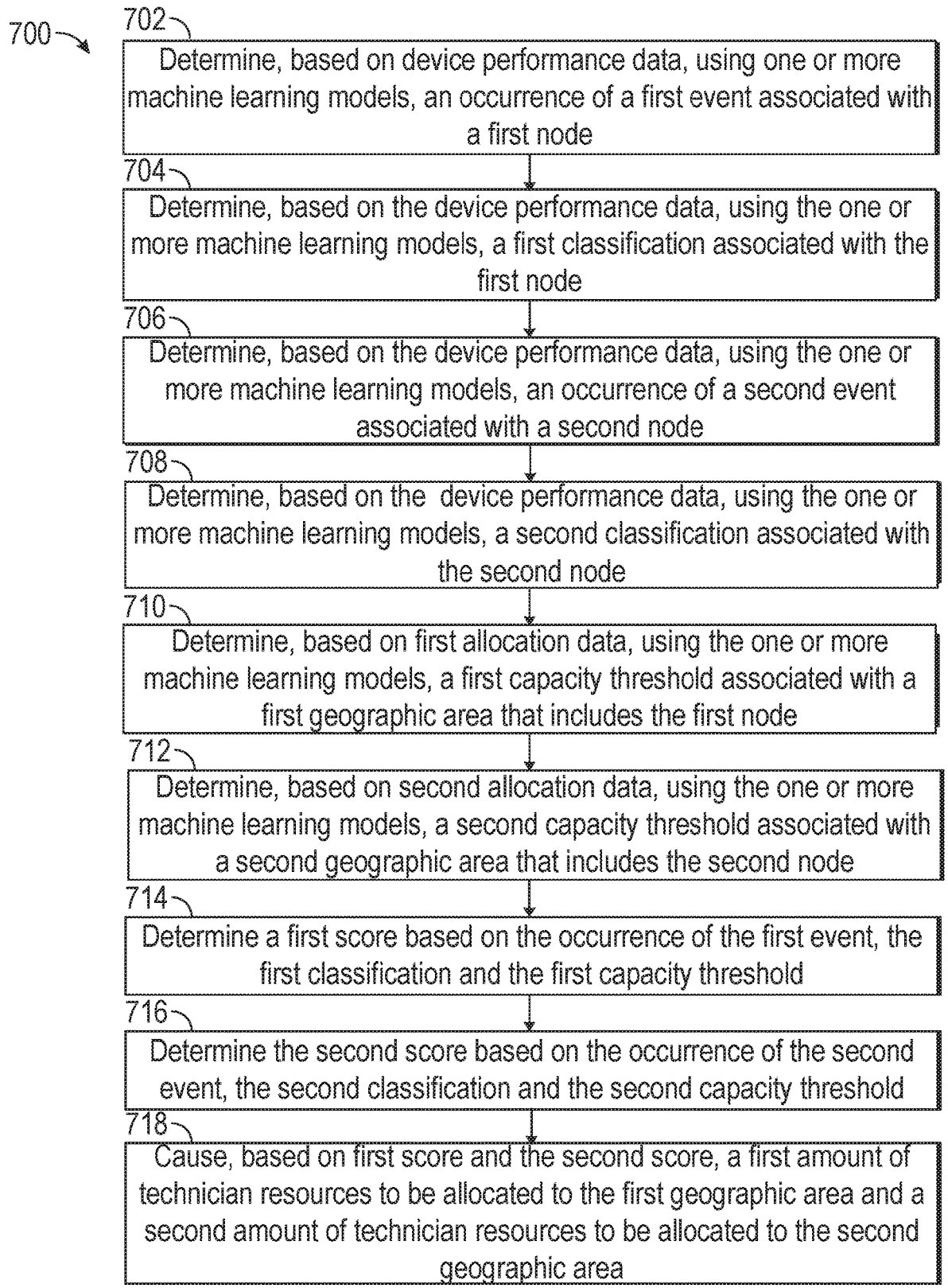
FIG. 7 depicts an example flow diagram for a process for network resource allocation, in accordance with one or more example embodiments of the present disclosure.

FIG. 7 depicts an example flow diagram of a process 700 for network resource allocation, in accordance with one or more example embodiments of the present disclosure.

At block 702, a CMTS system (or device, e.g., the network resources allocation module 132 of FIG. 1) may determine, based on performance data, using one or more machine learning models, an occurrence of a first event associated with the first node. For example, an anomaly detection model (e.g., the anomaly detection model 210 or 300) of the network resource allocation model may receive performance data associated with the first node (e.g., the first node 108 in FIG. 1) and may output a value indicative of a probability of an occurrence of the first event (e.g., a node outage will occur, an intermittent network issue have occurred for a node, an intermittent network issue have been occurring for a node, or the like). Examples of the anomaly detection model are described above with respect to FIGS. 2 and 3.

At block 704, the system may determine, based on the performance data, using one or more machine learning models, a first classification associated with the first node. For example, an anomaly detection model of the system may receive performance data associated with the first node and may output the first classification associated with the first event (e.g., a classification indicative of nodes having been experiencing intermittent network issues, a classification indicative of nodes having experienced intermittent network issues, a classification indicative of nodes will experience a node outage, a classification indicative of a bad node that is completely off, a classification indicative of a healthy node, or the like). Examples of the anomaly detection model are described above with respect to FIGS. 2 and 3.

At block 706, the system may determine, based on the performance data, using one or more machine learning models, an occurrence of a second event associated with the second node. For example, the anomaly detection model may receive performance data associated with the second node (e.g., the second node 120 in FIG. 1) and may output a value indicative of a probability of an occurrence of a second event. Examples of the anomaly detection model are described above with respect to FIGS. 2 and 3.

At block 708, the system may determine, based on the performance data, using one or more machine learning models, a second classification associated with the second node. For example, the anomaly detection model may receive performance data associated with the second node and may output the second classification associated with the second event. Examples of the anomaly detection model are described above with respect to FIGS. 2 and 3.

At block 710, the system may determine, based on first allocation data (e.g., previously allocated technician resources for the first node), using one or more machine learning models, a first capacity threshold associated with the first geographic area. For example, a capacity optimization model (e.g., the capacity optimization model 220 or 400) of the network resource allocation model may receive data associated with technician resources and the first geographic area (e.g., service queue volume 402, technician skills 404, and geographic area assignment 406 in FIG. 4), and may output the first capacity threshold indicative of a maximum and/or a minimum amount of technician resources for the first geographic area. Examples of the anomaly detection model are described above with respect to FIGS. 2 and 4.

At block 712, the system may determine, based on second allocation data (e.g., previously allocated technician resources for the second node), using one or more machine learning models, a second capacity threshold associated with the second geographic area. For example, the capacity optimization model may receive data associated with technician resources and the second geographic area (e.g., service queue volume 402, technician skills 404, and geographic area assignment 406 in FIG. 4), and may output the second capacity threshold indicative of a maximum and/or a minimum amount of technician resources for the second geographic area. Examples of the anomaly detection model are described above with respect to FIGS. 2 and 4.

At block 714, the system may determine a first node score based on the occurrence of the first event, the first classification, and the first capacity threshold. At block 716, the system may determine a second node score for the second node based on the second event, the second classification, and the second capacity threshold. For example, a node prioritization model (e.g., the node prioritization model 230 or 400) of the network resource allocation model may receive outputs from the anomaly detection model and the capacity optimization model as inputs. Additionally and/or alternatively, the node prioritization model may receive performance data and assignment data associated with the first node. Assignment data may include troubleshooting calls that have been received from customers, work orders that have been placed for the node, tickets that have been created for the node, or the like. The node prioritization model may output the first score. The node prioritization model may generate a first task ticket based on the occurrence of the first event and the first classification. The system may send the first task ticket to technicians. Examples of the node prioritization model are described above with respect to FIGS. 2 and 5.

In some embodiments, the system may compare the first predicted demand of technician resources with the first capacity threshold. If the first capacity threshold indicates a maximum amount of technician resources that can be allocated to the first geographic area, and the first predicted demand of technician resources is greater than the first capacity threshold, the system may reduce the first predicted demand of technician resources to be less than the first capacity threshold. If the first capacity threshold indicates a minimum amount of technician resources, and the first predicted demand of technician resources is less than the first capacity threshold, the system may increase the first predicted demand of technician resources to be greater than the first capacity threshold. In some embodiments, multiple capacity thresholds may be determined. For example, the system may allocate an amount of technician resources based on the first predicted demand of technician resources to the first geographic area, if the first predicted demand of technician resources falls within a capacity range defined by a second capacity threshold (e.g., a minimum amount of technician resources) and a third capacity threshold (e.g., a maximum amount of technician resources). The system may reduce the first predicted demand of technician resources, if the first predicted demand of technician resources is less than the third capacity threshold. The system may increase the first predicted demand of technician resources, if the first predicted demand of technician resources is greater than the second capacity threshold.

At block 716, the system may determine the second score is based on the occurrence of the second event, the second classification, and the second capacity threshold. For example, the node prioritization may receive outputs from the anomaly detection model and the capacity optimization model as inputs. Additionally and/or alternatively, the node prioritization model may receive performance data and assignment data associated with the second node. The node prioritization model may output the second score. The node prioritization model may generate a second task ticket based on the occurrence of the second event and the second classification. The system may send the second task ticket to technicians.

At block 718, the system may cause a third amount of technician resources to be allocated to the first geographic area and a fourth amount of technician resources to be allocated to the second geographic area. For example, the system may determine an amount of technician resources that will be allocated to a geographic area associated with a node, such as work schedules associated with technicians that will be allocated to the geographic area, work skills associated with the technicians that will be allocated to the geographic area, tasks associated with the technicians that will be allocated to the geographic area, or the like. The system may allocate the determined amount of technician resources to a corresponding geographic area (e.g., by setting work schedules, assigning technicians to geographic areas, generating service tickets and work orders, etc.). For example, based on the score, the system may determine that the first score is less than the second score, indicating that CM devices in the first geographic area may perform well and may not need much support for network troubleshooting as expected, and the system may determine devices in the second geographic area may need more support than expected. The system may cause resources to be allocated to nodes and/or geographic areas based on the node scores.

FIG. 8 depicts an example flow diagram for a process 800 for network resource allocation, in accordance with one or more example embodiments of the present disclosure.

At block 802, a CMTS system (or device, e.g., the network resources allocation module 132 of FIG. 1) may determine, based on device performance data, using one or more machine learning models, a first score associated with a first node, the first score indicative of a first predicted demand for technician resources associated with a first geographic area including the first node, wherein the first predicted demand for technician resources is associated with a first time period (e.g., a previous time). The score may be a predictive measure indicating predicted demand for technician services at the node.

At block 804, the system may determine an amount of technician resources allocated to the first geographic area during the first time period (e.g., the actual demand for technician resources that occurred during the first time period). The amount of technician resources allocated to the first geographic area may be based on a previous set of node scores. Using data indicative of work schedules, service tickets, work orders, etc., the system may determine the actual allocation of resources at the first geographic area. Based on the predicted service technician demand at the first geographic area and the current amount of technician resources allocated to the first geographic area, the system may adjust the amount of technician resources to be allocated to the first geographic area in advance of the predicted demand.

At block 806, the system may determine a difference between the amount of technician resources needed in the first geographic area to address the predicted demand and the current allocation of technician resources allocated to the first geographic area. The difference may indicate that more technician resources are needed when the current allocation of technician resources allocated to the first geographic area is less than the amount of technician resources needed in the first geographic area to address the predicted demand. The difference may indicate that fewer technician resources are needed when the current allocation of technician resources allocated to the first geographic area is greater than the amount of technician resources needed in the first geographic area to address the predicted demand.

At block 808, the system may determine, based on the difference, a second score associated with the first node. The second score may indicate whether the actual demand at the first node was greater than or less than the predicted demand for the first node. When the actual demand at the first node was greater than the predicted demand for the first node, the second score may be greater than the first score. When the actual demand at the first node was less than the predicted demand for the first node, the second score may be less than the first score. In this manner, the second score may represent an adjustment to the first score, and may be used to retrain one or more machine learning models that determine node scores.

At block 810, the system may train the one or more machine learning models based on the third score. For example, the system may train the network resource allocation model using the second score and the actual amount of technician resources demanded for the first node.

Figure 9:
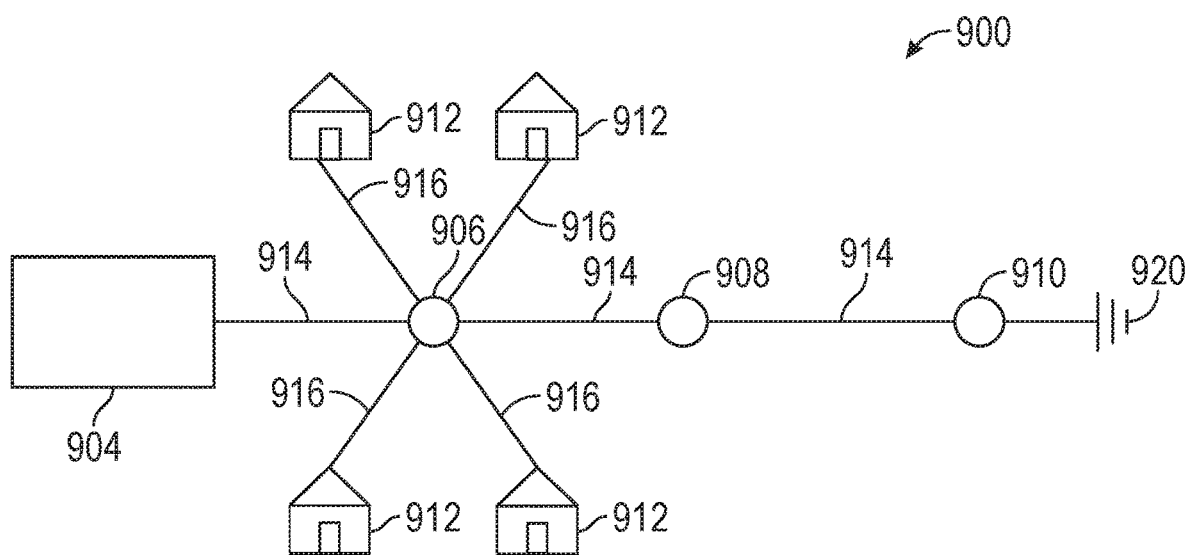
FIG. 9 depicts an example network architecture, in accordance with one or more example embodiments of the disclosure.

FIG. 9 shows an example diagram 900 of a portion of a cable network and associated devices in a particular network deployment, in accordance with example embodiments of the disclosure. In some instances, the cable network depicted in the example diagram 900 may be similar to the cable network of the system 100, and may provide additional details regarding the potential network architecture of such networks described herein. In some aspects, the cable network described herein may be implemented using a DOCSIS specification. The device 904 may include a CMTS, which can also be referred to as an access controller, a controller, and/or a node herein. In an embodiment, the device 904 may have a converged cable access platform (CCAP) functionality. In another embodiment, the device 904 may serve as remote physical (PHY) device, that is, a device having PHY layer functionality (that is, PHY layer functionality as described in connection with the open systems interconnection model, OSI model).

In an embodiment, there can be a fiber 914 connected to the device 904. The device 904 can further be connected to various network cable taps 906, 908, and 910, also referred to as taps or terminations herein, and can connect to various cable CPEs (e.g., CM devices), for example, at various households 912.

In some embodiments, a cable network can include a fiber optic network, which can extend from the cable operators' headend out to a neighborhood's hub site, and finally to a coaxial cable node which serves customers, for example, 25 to 2000 households (or any number of other households, or even commercial buildings).

In an embodiment, data can be transmitted downstream from the device 904 to one or more homes 912 over drop cables (also referred to as drops herein) 916 using one or more taps 906, 908, and 910. In an embodiment, as the data is transmitted downstream from the device 904 to one or more homes 912, the taps 906, 908, and 910 can potentially generate various impairments on the network. Alternatively or additionally, as the signals pass through from the device 904 to the taps 906, 908, and 910 over fibers 914 and to the homes 912 over one or more drops 916, the fibers 914 and/or the drops 916 can cause the signals to undergo various impairments, for example, to the power spectral density of the signals. In an embodiment, the impairment can be due to attenuation on the fibers 914 and/or drops 916. In an embodiment, the impairments can lead to frequency distortions on the signals; for example, the higher frequency end of the signals may be attenuated. Accordingly, in an embodiment, one or more amplifiers (not shown) can be used to perform a gain on the attenuated signals. In an embodiment, the one or more amplifiers can be placed, for example, at one or more of the taps 906, 908, and 910 to perform the gain on the attenuated signals.

In an embodiment, the homes 912, the devices in the homes 912, and taps 906, 908, and/or 910 can introduce different distortions on the drop cables 916 and/or fibers 914. In an embodiment if the distortion is introduced on a given fiber 914 feeding a first tap 906 of the taps 906, 908, and/or 910, different homes of the homes 912 may receive a similar distortion to signals being transmitted and received from one or more devices at the homes 912. In another embodiment, a distortion in at given tap of the taps 906, 908, and/or 910, a distortion at a given drop of the drops 916, or distortions associated with one or more cables and/or wires of one or more devices in a given home of the homes 912, may cause signals being received and transmitted at the various taps 906, 908, and/or 910, and/or signal being transmitted or received by the devices in the different homes 912 to undergo different signal distortions.

Likewise, in an embodiment, if the devices at various homes 912 are transmitting data upstream, the distortion to the signals experienced by devices at different homes 912 can be different. In an embodiment, the disclosed systems, methods, and apparatuses describe techniques by which various devices, for example, the various devices in the homes 912 may need to transmit to account for the different distortions on the network, as described above.

In an embodiment, a given transmitting device on the network can transmit a pre-determined sequence, for example a 32-symbol (or any suitable number of symbol) sequence where each symbol includes a pre-determined amount of data, to the receiving devices. Accordingly, when the receiving devices receive the pre-determined sequence, the receiving devices may be programmed to be able to determine one or more characteristics that the signal associated with the received pre-determined sequence should have. Therefore, the receiving device can determine whether there is a deviation from what the receiving device would have received absent distortions in the received signal.

In an embodiment, the receiving devices can take various measurements, for example, measurements to characterize one or more channels associated with signals received by the receiving device, and/or one or more measurements associated with he received signal from the transmitting device, including, but not limited to, signal-to-noise ratio (SNR) measurements, modulation error ratios (MER) measurements, slopes measurements, amplitude measurements, ripple measurements, spike (for example, non-linear noise distortions) measurements, absolute received power per subcarrier measurements, error vector magnitude measurements, and the like. The receiving device can then transmit at least portions of the measurements in informational blocks, for example, as data packets, back to the transmitting device. The transmitting device can modify a table based on the received information from the receiving device, for example, a table stored in internal memory. In an embodiment, the table can include information such as what sequence the receiving device would have received absent any distortions to the signal, what sequence the receiving device actually received, what sequence the transmitting device received back from the receiving device (which may also be subject to further distortions), and/or any information indicative of the measurements taken by the receiving device of the channel and/or the received signal, as described above. In some embodiments, the CMTS or controller can determine interference groups (IGs) based on the received information from the receiving devices.

In some aspects, the cable network as described above can include a regional or area headend/hub. The hub can receive programming that is encoded, modulated and upconverted onto radio frequency (RF) carriers, combined onto a single electrical signal and inserted into a broadband transmitter, for example, an optical transmitter. In some embodiments, the transmitter can convert the electrical signal to a downstream modulated signal that is sent to the nodes. Fiber optic cables connect the headend or hub to nodes in various topologies, including, but not limited to, point-to-point or star topologies, ring topologies, and the like.

By using frequency-division multiplexing, an HFC network such as the one described in connection with FIG. 9 may carry a variety of services, for example, analog and digital TV, video on demand, telephony, data, and the like. Services on these systems can be carried on radio frequency (RF) signals in particular regions of the available spectrum.

The HFC network can be operated bi-directionally such that signals are carried in both directions on the same network. For example, the signals can be transmitted from the headend/hub office to the customer, and from the customer to the headend/hub office. In one aspect, a forward-path or downstream signals can refer to information from the headend/hub office to the customer. In another aspect, a return-path or upstream signals can refer to information from the customer to the headend/hub office. The forward-path and the return-path can be carried over the same coaxial cable in both directions between the node and the customer equipment.

In some embodiments, HFC network can be structured to be asymmetrical, that is, data transmission in the downstream direction has much more data-carrying capacity than the upstream direction. Full Duplex can refer to a network specification that can improve upon DOCSIS 3.1 to use the full spectrum of the cable plant (for example, from approximately 0 MHz to approximately 1.2 GHz) at the same time in both upstream and downstream directions. This technology may facilitate multi-gigabit symmetrical services while remaining backwards compatible with DOCSIS 3.1.

In some embodiments, the DOCSIS may include at least one of (i) a DOCSIS 1.0, (ii) a DOCSIS 2.0, (iii) a DOCSIS 3.0, (iv) a DOCSIS 3.1, or (v) a DOCSIS 4.0 specification.

Figure 10:
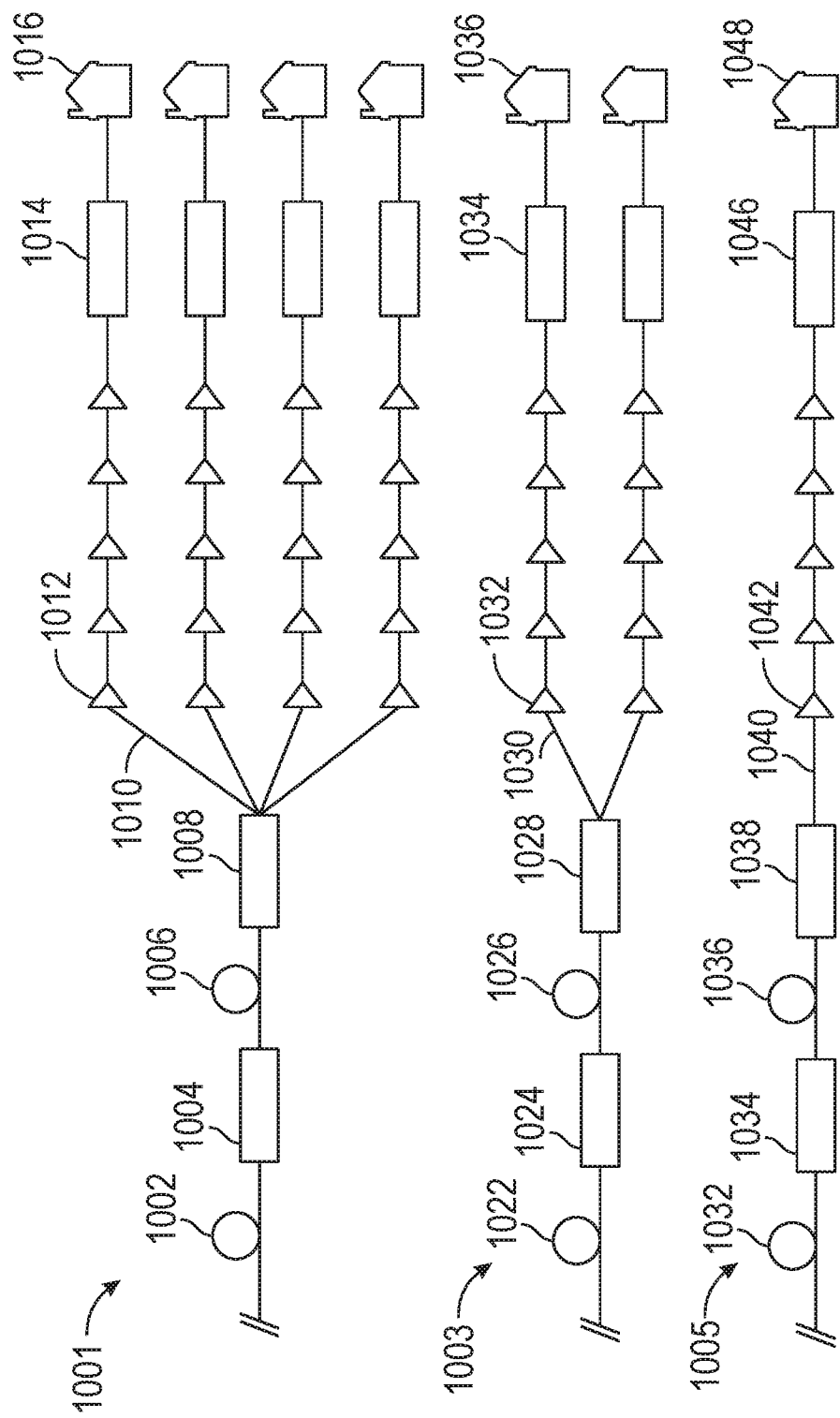
FIG. 10 depicts an example network architecture, in accordance with one or more example embodiments of the disclosure.

FIG. 10 shows example diagrams of another network architecture, in accordance with example embodiments of the disclosure. The network architecture may be similar to the cable network of the system 100, and may provide additional details regarding the potential network architecture of such networks described herein. That is, the network of the system 100 may include elements of the network architectures depicted in FIGS. 9 and 10. In one embodiment, as shown in diagram 1001, device 1004 can represent a headend device. In one aspect, device 1004 can include converged cable access platform (CCAP) device. CCAP can refer to equipment that combines aspects of the functionality of edge quadrature amplitude modulation (QAM) technology with cable model termination systems (CMTS s) to provide services such as internet and voice over IP while encoding and transmitting digital video channels over the cable network.

In one embodiment, the device 1004 can be electronically connected to device 1008, which can represent a node, for example, a node such as remote physical (PHY) device, remote medium access control (MAC) device, and/or remote hybrid PHY/MAC device. In one aspect, the electronic connection between device 1004 and device 1008 can be via a cable 1006, for example, a fiber optic cable. In an embodiment, device 1004 and/or 1008 can encompass aspects of the functionality of a computing entity 600, described below. In one embodiment, one or more of the devices 1004 and/or 1008 can include a switch, for example, a network switch such as an Ethernet switch.

In some embodiments, as shown in diagram 1001, the device 1008 can be electronically connected to a customer premise, for example, a home 1016 (also referred to herein as a household) and various devices associated with the home 1016. In another aspect, the device 1008 can be connected to the home 1016 through one or more amplifiers 1012 and/or one or more taps 1014. In some respects, the amplifiers can serve to amplify signals to restore attenuation of the signals during propagation over the network. In another aspect, diagram 1001 can represent a node-x embodiment, where node-x can represent a node having a variable number of amplifiers at a given node split. In particular, in diagram 1001, the network can have 5 amplifiers in each of the 4 node splits.

Similarly, as shown in diagram 1003, the device 1028 can be electronically connected to a customer premise, for example, a home 1036 (also referred to herein as a household) and various devices associated with the home 1036. In another aspect, the device 1028 can be connected to the home 1036 through one or more amplifiers 1032 and/or one or more taps 1034. In the case of diagram 1003, the number of node splits at the device 1028 can be less than the number of node splits in diagram 1001 (e.g., two node splits vs. four node splits).

Similarly, as shown in diagram 1005, the device 1038 can be electronically connected to a customer premise, for example, a home 1048 (also referred to herein as a household) and various devices associated with the home 1048. In another aspect, the device 1038 can be connected to the home 1048 through one or more amplifiers 1042 and/or a tap 1046. In the case of diagram 1005, the number of node splits at the device 1038 can be less than the number of node splits in diagram 1003 (e.g., zero node splits vs. 2 node splits).

Accordingly, diagram 1003 can represent a node-zero architecture, which can work without amplifiers.

In some embodiments, the disclosure describes providing the cable networks, such as the node-x and node-zero cable network deployments described above, with the ability to turn off sounding and resource block allocations in a given portion of the spectrum associated with FDX operation. Further, the disclosure describes configuring that portion of the spectrum as being static (i.e., not dynamic) with regards to changes in the starting and ending frequency. In some aspects, the disclosure describes simulating a hisplit using FDX.

As mentioned, lowsplit can refer to an approximately 5 MHz to approximately 42 MHz split in the United States. Midsplit can refer to an approximately 5 MHz to approximately 85 MHz split in the United States. Hisplit can refer to an approximately 5 MHz to approximately 204 MHz split in the United States; however, hisplit may not be generally deployed. In some embodiments, if amplifiers are used in a network that makes use of the node-x, the amplifiers may need to be replaced with devices having an approximately 5 MHz to approximately 204 MHz (or higher, up to approximately 684 MHz) return and an approximately 1 GHz to approximately 1.2 GHz forward capability.

In some embodiments, the system represented by diagram 1001 (and similarly for diagrams 1003 and 1005, implicitly described in the following) may include a source (not shown) which may be connected to device 1004 via cables 1002 and 1006. In another aspect, the system can include additional devices 1004 and 1008 and a tap or terminator 1014. The source may be configured to provide a downstream broadband signal to one or more customer devices and receive upstream signals from the one or more customer devices, for example, customer devices at the homes 1016. The devices 1004 and 1008 may be configured (i) to receive the downstream broadband signal via the cables 1002 and 1006, (ii) convert the downstream broadband signal into a radio frequency downstream signal, (iii) output the downstream broadband signal onto one or more cable lines (for example, cables 1002 and 1006) for communication to the one or more customer devices, (iv) receive the upstream signals via the one or more cable lines, and (v) convert the received upstream signals into light signals for communication to the source via the cables 1002 and 1006. The terminator 1014 may be in communication with the devices 1004 and 1008 via the cables, and the terminator 1014 may be configured to output the radio frequency downstream signal for receipt by the one or more customer devices and direct the communication of the upstream signals to the optical fiber node via the one or more cables.

In some embodiments, the source may be a suitable source of broadband content, such as a cable plant. The source may be configured to generate and/or combine any number of data streams and/or data components into a broadband signal that is output by the source for receipt by one or more households, for example, homes 1016. For example, the source may be configured to obtain video data streams from one or more content providers, such as television networks, premium content providers, and/or other content providers, and the source may be configured to generate a broadband signal based at least in part on the video data streams. As desired, the source may insert commercials and/or other data into a television or video component of a broadband signal. Additionally, the source may be configured to generate or obtain any number of data components that are inserted or added to a broadband signal, such as television guide data, an Internet data signal, home security data signals, voice over internet protocol (VoIP) telephone signals, etc. Any number of modulation techniques and/or data standards may be utilized by a source in the generation or compilation of a broadband data signal. For example, television data may be modulated utilizing a suitable quadrature amplitude modulation (QAM) or other modulation technique, and the modulated data may be incorporated into the broadband data signal. As another example, an orthogonal frequency-division multiple access (OFDMA) technique, a time division multiple access (TDMA) technique, an advanced time division multiple access (ATDMA) technique, a synchronous code division multiple access (SCDMA) technique, or another suitable modulation technique or scheme may be utilized to modulate data included within the broadband data signal. The broadband data signal may be configured to provide a wide variety of services to one or more households, including but not limited to, television service, telephone service, Internet service, home monitoring service, security service, etc.

In certain embodiments, the generated broadband signal may be output utilizing one or more cables 1002 and/or 1006, for example, fiber optic cables or optical fibers that are configured to carry the broadband signal from the source to one or more corresponding devices, for example, devices 1004 and 1008. For example, the radio frequency broadband signal may be processed utilizing one or more suitable wavelength-division multiplexing (WDM) devices or WDM systems, and the processed signal may be provided to or driven onto an optical fiber. A wide variety of different types of WDM devices may be utilized as desired in various embodiments of the disclosure, such as dense WDM devices and add-drop WDM devices. As desired, a WDM device may include a terminal multiplexer component that includes one or more wavelength converting transponders. Each wavelength converting transponder may receive one or more components of the input broadband signal and convert that signal into a light signal using a suitable laser, such as a 1550 nm band laser. The terminal multiplex may also contain an optical multiplexer configured to receive the various 1550 nm band signals and place or drive those signals onto a single optical fiber.

As desired, the WDM device may amplify the broadband signals that are processed by the WDM device. Additionally or alternatively, one or more line repeaters or other amplifying devices (such as amplifiers 1012) may be positioned along a length of the optical fiber in order to amplify the broadband signal and compensate for any losses in optical power.

In addition to processing downstream or forward path signals that are received from the source, the WDM device may be configured to receive and process upstream signals that are communicated to the source from the households, for example, from homes 1016. Cables, for example cables 1002 and 1006 (which can include, for example, optical fibers) may be configured to carry broadband signals between the source and the devices 1004 and 1008, and the taps 1014. These signals may include forward path signals generated by the source and return path signals generated by one or more households, for example, from homes 1016. A wide variety of different optical fibers may be utilized as desired in various embodiments of the disclosure, such as multi-mode fibers, single-mode fibers, and special purpose fibers. Additionally, the optical fibers may be constructed from a wide variety of different materials, such as silica, fluorides, phosphates, and/or chalcogenides. The optical fibers may be configured to carry signals as light pulses utilizing total internal reflection.

Moreover, any number of devices 1004 and 1008, which can alternatively or additionally be referred to as fiber nodes may be provided. Each fiber node may be configured to receive and process downstream or forward path signals from the source. Additionally, each fiber node may be configured to receive and process upstream or return path signals received from the one or more households.

In some embodiments, once a signal has been filtered out or otherwise isolated by the amplifiers 1012, the amplifiers 1012 may amplify the signal. For example, the amplifiers 1012 may increase the amplitude of the signal. In certain embodiments, the various components of a broadband signal (e.g., low return path, forward path, high return path) may be amplified by respective amplification components of the amplifiers 1012. Each amplified signal may then be output onto or driven back onto the cable line in a desired direction for the signal. As desired, any number of diodes or other suitable devices may be incorporated into the amplifiers 1012 in order to prevent or limit undesired leakage of an amplified signal in a direction from which the signal was received. For example, the amplifiers 1012 may receive a return path signal from a terminator 1014 or other amplifier, the amplifiers 1012 may amplify the signal, and the amplifier may output the signal in an upstream direction towards devices 1004 and 1008 and/or source while limiting the output or leakage of the signal in a downstream direction.

The amplifiers 1012 may include a wide variety of gains as desired in various embodiments of the disclosure. Additionally, as desired, different gains may be utilized for different components of a broadband signal. In certain embodiments, the amplifiers 1012 may be powered by a received broadband signal, such as a received downstream signal. Additionally or alternatively, the amplifiers 1012 may be powered by one or more batteries and/or external power sources. In certain embodiments, the power requirements of the amplifiers 1012 may be based at least in part on the modulation technique(s) utilized in association with the broadband signals that are amplified. In one example embodiment, a relatively low power amplifier may be provided in association with an OFDMA modulation technique.

Any number of terminators 1014 or taps may be connected to a cable line. A terminator 1014 may form an access point from which one or more households, such as households 1016, may be provided with broadband services. Any number of households may be serviced by a terminator 1014 as desired in various embodiments of the disclosure. For example, in certain embodiments, up to four households may be serviced by a terminator 1014. As desired, a cable drop or other signal line (e.g., a coaxial cable or RF cable) may extend from the terminator 1014 to a household 1016. In this regard, signals may be provided to and/or received from the household 1016.

In an embodiment, the signals transmitted between the CTMS and the CMs can be purified via echo cancellation both in the analog and digital domain. In another embodiment, an analog echo canceller can reduce the echoes of the signal in the analog domain. In an embodiment the analog echo canceller can reduce the echo, group delay, noise amplitude, and the like, of the signal. The signal can, alternatively or additionally, proceed to an analog-to-digital converter (ADC) for conversion to the digital domain. In an embodiment, the signal can proceed thereafter to a digital echo canceller, which can remove echoes and the like in the digital domain. In an embodiment, the output of the digital echo canceler can be transmitted from the CMTS to a device, for example, a cable CPE.

Figure 11:
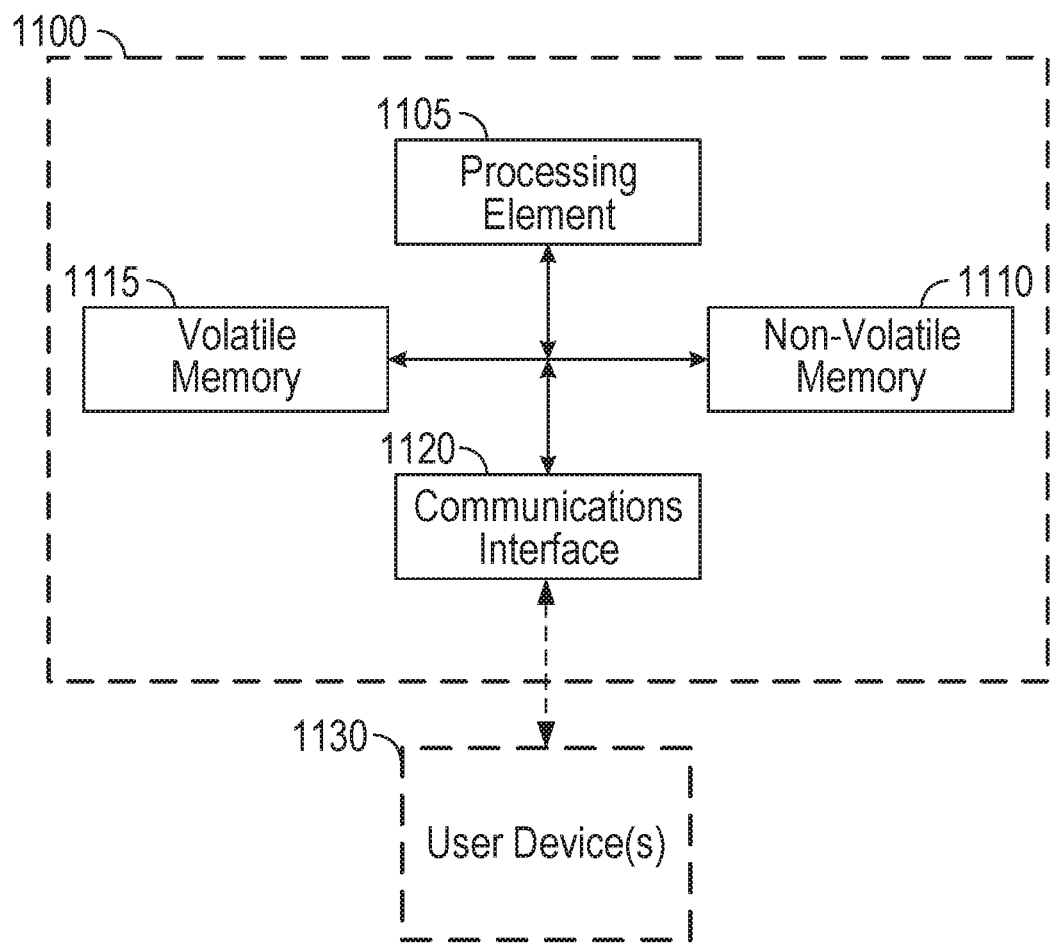
FIG. 11 depicts an example computing entity, in accordance with one or more example embodiments of the disclosure.

FIG. 11 provides a schematic of a network computing entity 1100 according to one embodiment of the present disclosure. The computing entity may be used to perform any of the operations described herein, such as the network resource allocation described with respect to any of FIGS. 1-5, for example. The network computing entity 1100 may be one embodiment of the CMTS 130. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, and the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the network computing entity 1100 may also include one or more communications interfaces 1120 for communicating with various computing entities, such as by communicating data, content, information, and/or similar terms used herein interchangeably that can be transmitted, received, operated on, processed, displayed, stored, and/or the like. For instance, the network computing entity 1100 may communicate with user devices 1130 (e.g., mobile phone, laptop, computer or the like) and/or a variety of other computing entities.

As shown in FIG. 11, in one embodiment, the network computing entity 1100 may include or be in communication with one or more processing elements 1105 (also referred to as processors, processing circuitry, and/or similar terms used herein interchangeably) that communicate with other elements within the network computing entity 1100 via a bus, for example. As will be understood, the processing element 1105 may be embodied in a number of different ways. For example, the processing element 1105 may be embodied as one or more complex programmable logic devices (CPLDs), microprocessors, multi-core processors, coprocessing entities, application-specific instruction set processors (ASIPs), microcontrollers, and/or controllers. Further, the processing element 1105 may be embodied as one or more other processing devices or circuitry. The term circuitry may refer to an entirely hardware embodiment or a combination of hardware and computer program products. Thus, the processing element 1105 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 1105 may be configured for a particular use or configured to execute instructions stored in volatile or non-volatile media or otherwise accessible to the processing element 1105. As such, whether configured by hardware or computer program products, or by a combination thereof, the processing element 1105 may be capable of performing steps or operations according to embodiments of the present disclosure when configured accordingly.

In one embodiment, the network computing entity 1100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 1110, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the network computing entity 1100 may further include or be in communication with volatile media (also referred to as volatile storage, memory, memory storage, memory circuitry and/or similar terms used herein interchangeably). In one embodiment, the volatile storage or memory may also include one or more volatile storage or memory media 1115, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 1105. Thus, the databases, database instances, database management systems, data, applications, programs, program modules, scripts, source code, object code, byte code, compiled code, interpreted code, machine code, executable instructions, and/or the like may be used to control certain aspects of the operation of the network computing entity 1100 with the assistance of the processing element 1105 and operating system.

As indicated, in one embodiment, the network computing entity 1100 may also include one or more communications interfaces 1120 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the network computing entity 1100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the network computing entity 1100 may include or be in communication with one or more input elements, such as a keyboard input, a mouse input, a touch screen/display input, motion input, movement input, audio input, pointing device input, joystick input, keypad input, and/or the like. The network computing entity 1100 may also include or be in communication with one or more output elements (not shown), such as audio output, video output, screen/display output, motion output, movement output, and/or the like.

As will be appreciated, one or more components of the network computing entities 1100 may be located remotely from other network computing entity 1100 components, such as in a distributed system. Furthermore, one or more of the components may be combined and additional components performing functions described herein may be included in the network computing entity 1100. Thus, the network computing entity 1100 can be adapted to accommodate a variety of needs and circumstances. As will be recognized, these architectures and descriptions are provided for example purposes only and are not limiting to the various embodiments.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, an information/data processing apparatus. Alternatively, or in addition, the program instructions can be encoded on an artificially generated propagated signal, e.g., a machine-generated electrical, optical, or electromagnetic signal, which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, a software application, a script, or code) can be written in any form of programming language, including compiled or interpreted languages, and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on the input of information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of the client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method comprising:
   inputting, by at least one processor of a cable modem termination system (CMTS) device, to a first machine learning model trained to estimate probabilities of nodes experiencing future outage events, performance data associated with a plurality of customer premise devices and a plurality of nodes, wherein the plurality of customer premise devices comprises a first customer premise device and a second customer premise device, the first customer premise device associated with a first node of the plurality of nodes, the second customer premise device associated with a second node of the plurality of nodes;
   generating, by the first machine learning model, based on the performance data, a first probability of the first node experiencing a first future outage event;
   generating, by the first machine learning model, based on the performance data, a second probability of the second node experiencing a second future outage event;
   inputting, to a second machine learning model trained to estimate an optimized amount of technician resources for geographic areas, a first amount of technician resources allocated to a first geographic area comprising the first node;
   inputting, to the second machine learning model, a second amount of technician resources allocated to a second geographic area comprising the second node, the first amount of technician resources greater than the second amount of technician resources;
   generating, by the second machine learning model, based on the first amount of technician resources, a first optimal amount of technician resources for the first geographic area;
   generating, by the second machine learning model, based on the second amount of technician resources, a second optimal amount of technician resources for the second geographic area;
   determining, based on the performance data, the first probability, the second probability, the first optimal amount of technician resources, and the second optimal amount of technician resources input to a third machine learning model trained using node performance data and technician resource data to predict demand for technician resources, a first score associated with the first node, the first score indicative of a first predicted demand for technician resources;
   determining, based on the performance data, the first probability, the second probability, the first optimal amount of technician resources, and the second optimal amount of technician resources input to the third machine learning model, a second score associated with the second node, the second score indicative of a second predicted demand for technician resources;
   re-training, based on feedback based on comparisons of the first predicted demand and the second predicted demand to actual demand for technician resources at the first node and the second node, the third machine learning model to generate a third score indicative of a third predicted demand for technician resources at the first node and a fourth score indicative of a fourth predicted demand for technician resources at the second node; and
   causing, based on the third score and the fourth score, a third amount of technician resources to be allocated to the first geographic area and a fourth amount of technician resources to be allocated to the second geographic area.

2. The method of claim 1, further comprising:
   predicting, based on the performance data, using the first machine learning model, an occurrence of the first future outage event, the first future outage event associated with a first performance metric failing to satisfy a first performance threshold;
   generating, by the first machine learning model, based on the performance data, a first classification associated with the first node, the first classification associated with a first frequency at which the first future outage event occurs at the first node;
   predicting, by the first machine learning model, based on the performance data, an occurrence of the second future outage event, the second future outage event associated with a second performance metric failing to satisfy a second performance threshold; and
   generating, by the first machine learning model, based on the performance data, a second classification associated with the second node, the second classification associated with a second frequency at which the second future outage event occurs at the second node,
   wherein determining the first score is based on the occurrence of the first future outage event and the first classification, and
   wherein determining the second score is based on the occurrence of the second future outage event and the second classification.

3. The method of claim 1, further comprising:
   receiving first allocation data associated with previously allocated technician resources for the first geographic area;

receiving second allocation data associated with previously allocated technician resources for the second geographic area;

determining, based on the first allocation data, using the second machine learning model, a first capacity threshold associated with the first geographic area; and determining, based on the second allocation data, using the second machine learning model, a second capacity threshold associated with the second geographic area, wherein determining the first score is based on the first capacity threshold, and wherein determining the second score is based on the second capacity threshold.

4. The method of claim 3, further comprising:
determining, using the third machine learning model, that the first predicted demand for technician resources is less than the first capacity threshold; and determining, using the third machine learning model, that the second predicted demand for technician resources is greater than the second capacity threshold, wherein causing the third amount of technician resources to be allocated to the first geographic area is based on the determination that the first predicted demand is less than the first capacity threshold, and wherein causing the fourth amount of technician resources to be allocated to the second geographic area is based on the determination that the second predicted demand is greater than the first capacity threshold.

5. The method of claim 1, wherein the first predicted demand for technician resources and the second predicted demand for technician resources are associated with a first time period, the method further comprising:

determining a fifth amount of technician resources allocated to the first geographic area during the first time period;

determining a difference between the first predicted demand for technician resources and the fifth amount of technician resources;

determining, based on the difference, a fifth score associated with the first node; and re-training the third machine learning model based on the fifth score.

6. The method of claim 1, further comprising:
determining that a signal quality associated with a first group of customer premise devices of the plurality of customer premise devices is below a signal quality threshold, wherein the first group of customer premise devices is associated with the first node;

determining that a signal quality associated with a second group of customer premise devices of the plurality of customer premise devices is below the signal quality threshold, wherein the second group of customer premise devices is associated with the second node;

determining that the first group of customer premise devices is less than the second group of customer premise devices; and determining that the second predicted demand for technician resources is greater than the first predicted demand for technician resources based on the determination that the first group of customer premise devices is less than the second group of customer premise devices.

7. The method of claim 1, further comprising:
determining that a signal quality associated with a first group of customer premise devices of the plurality of customer premise devices is below a signal quality threshold;

determining that a signal quality associated with a second group of customer premise devices of the plurality of customer premise devices is below the signal quality threshold, wherein the first geographic area comprises the first group of customer premise devices and the second group of customer premise devices;

determining that the first group of customer premise devices communicate with a first device;

determining that the second group of customer premise devices communicate with a second device;

determining that the first group of customer premise devices is less than the second group of customer premise devices; and causing a fifth amount of technician resources to be allocated to the second device.

8. The method of claim 1, further comprising:
generating, based on the first score, a first service ticket associated with the first node;

generating, based on the second score, a second service ticket associated with the second node; and sending the first service ticket and the second service ticket to a first device.

9. A cable modem termination system comprising memory coupled to at least one processor, the at least one processor configured to:

input, to a first machine learning model trained to estimate probabilities of nodes experiencing future outage events, performance data associated with a plurality of customer premise devices and a plurality of nodes, wherein the plurality of customer premise devices comprises a first customer premise device and a second customer premise device, the first customer premise device associated with a first node of the plurality of nodes, the second customer premise device associated with a second node of the plurality of nodes;

generate, by the first machine learning model, based on the performance data, a first probability of the first node experiencing a first future outage event;

generate, by the first machine learning model, based on the performance data, a second probability of the second node experiencing a second future outage event;

input, to a second machine learning model trained to estimate an optimized amount of technician resources for geographic areas, a first amount of technician resources allocated to a first geographic area comprising the first node;

input, to the second machine learning model, a second amount of technician resources allocated to a second geographic area comprising the second node, the first amount of technician resources greater than the second amount of technician resources;

generate, by the second machine learning model, based on the first amount of technician resources, a first optimal amount of technician resources for the first geographic area;

generate, by the second machine learning model, based on the second amount of technician resources, a second optimal amount of technician resources for the second geographic area;

determine, based on the performance data, the first probability, the second probability, the first optimal amount of technician resources, and the second optimal amount of technician resources input to a third machine learning model trained using node performance data and technician resource data to predict demand for technician resources, a first score associated with the first node, the first score indicative of a first predicted demand for technician resources;
determine, based on the performance data, the first probability, the second probability, the first optimal amount of technician resources, and the second optimal amount of technician determine, based on the performance data, the first probability, the second probability, the first optimal amount of technician resources, and the second optimal amount of technician resources input to the third machine learning model, a second score associated with the second node, the second score indicative of a second predicted demand for technician resources;
re-train, based on feedback based on comparisons of the first predicted demand and the second predicted demand to actual demand for technician resources at the first node and the second node, the third machine learning model to generate a third score indicative of a third predicted demand for technician resources at the first node and a fourth score indicative of a fourth predicted demand for technician resources at the second node; and
cause, based on the third score and the fourth score, a third amount of technician resources to be allocated to the first geographic area and a fourth amount of technician resources to be allocated to the second geographic area.

10. The cable modem termination system of claim 9, wherein the at least one processor is further configured to:
predict, based on the performance data, using the first machine learning model, an occurrence of the first future outage event, the first future outage event associated with a first performance metric failing to satisfy a first performance threshold;
generate, by the first machine learning model, based on the performance data, a first classification associated with the first node, the first classification associated with a first frequency at which the first future outage event occurs at the first node;
determine predict, by the first machine learning model, based on the performance data, an occurrence of the second future outage event, the second future outage event associated with a second performance metric failing to satisfy a second performance threshold; and
generate, by the first machine learning model, based on the performance data, a second classification associated with the second node, the second classification associated with a second frequency at which the second future outage event occurs at the second node,
wherein to determine the first score is based on the occurrence of the first future outage event and the first classification, and
wherein to determine the second score is based on the occurrence of the second future outage event and the second classification.

11. The cable modem termination system of claim 9, wherein the at least one processor is further configured to:
receive first allocation data associated with previously allocated technician resources for the first geographic area;
receive second allocation data associated with previously allocated technician resources for the second geographic area;
determine, based on the first allocation data, using the second machine learning model, a first capacity threshold associated with the first geographic area; and
determine, based on the second allocation data, using the second machine learning model, a second capacity threshold associated with the second geographic area,
wherein to determine the first score is based on the first capacity threshold, and
wherein to determine the second score is based on the second capacity threshold.

12. The cable modem termination system of claim 11, wherein the at least one processor is further configured to:
determine, using the third machine learning model, that the first predicted demand for technician resources is less than the first capacity threshold; and
determine, using the third machine learning model, that the second predicted demand for technician resources is greater than the second capacity threshold,
wherein to cause the third amount of technician resources to be allocated to the first geographic area is based on the determination that the first predicted demand is less than the first capacity threshold, and
wherein to cause the fourth amount of technician resources to be allocated to the second geographic area is based on the determination that the second predicted demand is greater than the first capacity threshold.

13. The cable modem termination system of claim 9, wherein the first predicted demand for technician resources and the second predicted demand for technician resources are associated with a first time period, and wherein the at least one processor is further configured to:
determine a fifth amount of technician resources allocated to the first geographic area during the first time period;
determine a difference between the first predicted demand for technician resources and the fifth amount of technician resources;
determine, based on the difference, a fifth score associated with the first node; and
re-train the third machine learning model based on the fifth score.

14. The cable modem termination system of claim 9, wherein the at least one processor is further configured to:
determine that a signal quality associated with a first group of customer premise devices of the plurality of customer premise devices is below a signal quality threshold, wherein the first group of customer premise devices is associated with the first node;
determine that a signal quality associated with a second group of customer premise devices of the plurality of customer premise devices is below the signal quality threshold, wherein the second group of customer premise devices is associated with the second node;
determine that the first group of customer premise devices is less than the second group of customer premise devices; and
determine that the second predicted demand for technician resources is greater than the first predicted demand for technician resources based on the determination that the first group of customer premise devices is less than the second group of customer premise devices.

15. A non-transitory computer readable medium including computer-executable instructions stored thereon, which when executed by one or more processors of a wireless access point, cause the one or more processors to perform operations of:
inputting, by at least one processor of a cable modem termination system (CMTS), to a first machine learning model trained to estimate probabilities of nodes experiencing future outage events, performance data associated with a plurality of customer premise devices and a plurality of nodes, wherein the plurality of customer premise devices comprises a first customer premise device and a second customer premise device, the first customer premise device associated with a first node of the plurality of nodes, the second customer premise device associated with a second node of the plurality of nodes;

generating, by the first machine learning model, based on the performance data, a first probability of the first node experiencing a first future outage event;

generating, by the first machine learning model, based on the performance data, a second probability of the second node experiencing a second future outage event;

inputting, to a second machine learning model trained to estimate an optimized amount of technician resources for geographic areas, a first amount of technician resources allocated to a first geographic area comprising the first node;

inputting, to the second machine learning model, a second amount of technician resources allocated to a second geographic area comprising the second node, the first amount of technician resources greater than the second amount of technician resources;

generating, by the second machine learning model, based on the first amount of technician resources, a first optimal amount of technician resources for the first geographic area;

generating, by the second machine learning model, based on the second amount of technician resources, a second optimal amount of technician resources for the second geographic area;

determining, based on the performance data, the first probability, the second probability, the first optimal amount of technician resources, and the second optimal amount of technician resources input to a third machine learning model trained using node performance data and technician resource data to predict demand for technician resources, a first score associated with the first node, the first score indicative of a first predicted demand for technician resources;

determining, based on the performance data, the first probability, the second probability, the first optimal amount of technician resources, and the second optimal amount of technician determining, based on the performance data, the first probability, the second probability, the first optimal amount of technician resources, and the second optimal amount of technician resources input to the third machine learning model, a second score associated with the second node, the second score indicative of a second predicted demand for technician resources;

re-training, based on feedback based on comparisons of the first predicted demand and the second predicted demand to actual demand for technician resources at the first node and the second node, the third machine learning model to generate a third score indicative of a third predicted demand for technician resources at the first node and a fourth score indicative of a fourth predicted demand for technician resources at the second node; and causing, based on the third score and the fourth score, a third amount of technician resources to be allocated to the first geographic area and a fourth amount of technician resources to be allocated to the second geographic area.

16. The non-transitory computer readable medium of claim 15, the operations further comprising:

predicting, based on the performance data, using the first machine learning model, an occurrence of the first future outage event, the first future outage event associated with a first performance metric failing to satisfy a first performance threshold;

determining, by the first machine learning model, based on the performance data, a first classification associated with the first node, the first classification associated with a first frequency at which the first future outage event occurs at the first node;

determining, based on the performance data, using the first machine learning model, an occurrence of the second future outage event, the second future outage event associated with a second performance metric failing to satisfy a second performance threshold; and determining, by the first machine learning model, based on the performance data, a second classification associated with the second node, the second classification associated with a second frequency at which the second future outage event occurs at the second node, wherein determining the first score is based on the occurrence of the first future outage event and the first classification, and wherein determining the second score is based on the occurrence of the second future outage event and the second classification.

17. The non-transitory computer readable medium of claim 15, the operations further comprising:

receiving first allocation data associated with previously allocated technician resources for the first geographic area;

receiving second allocation data associated with previously allocated technician resources for the second geographic area;

determining, based on the first allocation data, using the second machine learning model, a first capacity threshold associated with the first geographic area; and determining, based on the second allocation data, using the second machine learning model, a second capacity threshold associated with the second geographic area, wherein determining the first score is based on the first capacity threshold, and wherein determining the second score is based on the second capacity threshold.

18. The non-transitory computer readable medium of claim 17, the operations further comprising:

determining, using the third machine learning model, that the first predicted demand for technician resources is less than the first capacity threshold; and determining, using the third machine learning model, that the second predicted demand for technician resources is greater than the second capacity threshold, wherein causing the third amount of technician resources to be allocated to the first geographic area is based on the determination that the first predicted demand is less than the first capacity threshold, and wherein causing the fourth amount of technician resources to be allocated to the second geographic area is based on the determination that the second predicted demand is greater than the first capacity threshold.

19. The non-transitory computer readable medium of claim 15, wherein the first predicted demand for technician resources and the second predicted demand for technician resources are associated with a first time period, the operations further comprising:

determining a fifth amount of technician resources allocated to the first geographic area during the first time period;

determining a difference between the first predicted demand for technician resources and the fifth amount of technician resources;

determining, based on the difference, a fifth score associated with the first node; and re-training the third machine learning model based on the fifth score.

20. The non-transitory computer readable medium of claim 15, the operations further comprising:

determining that a signal quality associated with a first group of customer premise devices of the plurality of customer premise devices is below a signal quality threshold, wherein the first group of customer premise devices is associated with the first node;

determining that a signal quality associated with a second group of customer premise devices of the plurality of customer premise devices is below the signal quality threshold, wherein the second group of customer premise devices is associated with the second node;

determining that the first group of customer premise devices is less than the second group of customer premise devices; and determining that the second predicted demand for technician resources is greater than the first predicted demand for technician resources based on the determination that the first group of customer premise devices is less than the second group of customer premise devices.

* * * * *